US011265527B2

(12) United States Patent
Abbas et al.

(10) Patent No.: US 11,265,527 B2
(45) Date of Patent: Mar. 1, 2022

(54) METHODS AND APPARATUS FOR PROVIDING A FRAME PACKING ARRANGEMENT FOR PANORAMIC CONTENT

(71) Applicant: GoPro, inc., San Mateo, CA (US)

(72) Inventors: Adeel Abbas, Carlsbad, CA (US); David A. Newman, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 0 days.

(21) Appl. No.: 16/786,283

(22) Filed: Feb. 10, 2020

(65) Prior Publication Data

US 2020/0177863 A1 Jun. 4, 2020

Related U.S. Application Data

(63) Continuation of application No. 15/665,202, filed on Jul. 31, 2017, now Pat. No. 10,560,682.
(Continued)

(51) Int. Cl.
*H04N 13/00* (2018.01)
*H04N 13/161* (2018.01)
(Continued)

(52) U.S. Cl.
CPC ......... *H04N 13/161* (2018.05); *G06T 3/4038* (2013.01); *H04N 5/23238* (2013.01);
(Continued)

(58) Field of Classification Search
CPC ............. H04L 69/168; H04W 40/246; H04W 40/248; H04W 40/36; H04W 4/06;
(Continued)

(56) References Cited

U.S. PATENT DOCUMENTS 1,011,081 A 12/1911 Reely
10,110,814 B1 10/2018 Day
(Continued)

OTHER PUBLICATIONS

Tarek El-Ganainy, Streaming Virtual Reality Content, Dec. 26, 2016 (Year: 2016).*
(Continued)

*Primary Examiner* — Md N Haque
(74) *Attorney, Agent, or Firm* — Young Basile Hanlon & MacFarlane, P.C.

(57) ABSTRACT

Apparatus and methods for providing a frame packing arrangement for the encoding/decoding of, for example, panoramic content. In one embodiment, an encoder apparatus is disclosed. In a variant, the encoder apparatus is configured to encode Segmented Sphere Projections (SSP) imaging data and/or Rotated Sphere Projections (RSP) imaging data into an extant imaging format. In another variant, a decoder apparatus is disclosed. In one embodiment, the decoder apparatus is configured to decode SSP imaging data and/or RSP imaging data from an extant imaging format. Computing devices, computer-readable storage apparatus, integrated circuits and methods for using the aforementioned encoder and decoder are also disclosed.

20 Claims, 34 Drawing Sheets

Related U.S. Application Data

(60) Provisional application No. 62/477,936, filed on Mar. 28, 2017, provisional application No. 62/473,952, filed on Mar. 20, 2017, provisional application No. 62/465,678, filed on Mar. 1, 2017, provisional application No. 62/462,804, filed on Feb. 23, 2017, provisional application No. 62/446,297, filed on Jan. 13, 2017.

(51) Int. Cl.
| | | |
|---|---|---|
| *H04N 5/232* | (2006.01) | |
| *G06T 3/40* | (2006.01) | |
| *H04N 19/597* | (2014.01) | |
| *H04N 19/124* | (2014.01) | |
| *H04N 19/40* | (2014.01) | |
| *H04N 19/70* | (2014.01) | |
| *H04N 13/156* | (2018.01) | |
| *H04N 13/178* | (2018.01) | |
| *H04N 7/015* | (2006.01) | |
| *H04N 19/59* | (2014.01) | |

(52) U.S. Cl.
CPC .......... *H04N 7/015* (2013.01); *H04N 13/156* (2018.05); *H04N 13/178* (2018.05); *H04N 19/124* (2014.11); *H04N 19/40* (2014.11); *H04N 19/597* (2014.11); *H04N 19/70* (2014.11); *H04N 19/59* (2014.11)

(58) Field of Classification Search
CPC ..... H04W 60/04; H04W 76/11; H04W 80/04; H04W 92/02; H04N 13/156; H04N 13/161; H04N 13/178; H04N 19/40; H04N 19/597; H04N 19/70; H04N 5/23238; H04N 7/015
See application file for complete search history.

(56) References Cited

U.S. PATENT DOCUMENTS

| | | | |
|---|---|---|---|
| 2002/0126914 A1* | 9/2002 | Kotake | ................ G06T 15/205 382/282 |
| 2002/0159166 A1 | 10/2002 | Herman | |
| 2013/0307924 A1 | 11/2013 | Cho | |
| 2014/0168357 A1 | 6/2014 | Venable | |
| 2015/0161820 A1 | 6/2015 | Vincent | |
| 2015/0281507 A1 | 10/2015 | Konen | |
| 2016/0295108 A1* | 10/2016 | Cao | ...................... H04N 17/002 |
| 2016/0337706 A1* | 11/2016 | Hwang | .............. H04N 21/4382 |

OTHER PUBLICATIONS

"AHG8: Algorithm description of projection format conversion in 360Lib" Authors: He Y, Xiu X, Ye (InterDigital) Y, Zakharchenko V, Singh A, Dsouza (Samsung) A, C-C Huang, J-L Lin (MediaTek), Sun Y, Lu A, Yu (Zhejiang Univ) L, Van der Auwera (Qualcomm) G, Zhang C, Lu (OwlReality) Y Publication data: 5. JVET meeting; Dec. 1, 2017-Jan. 20, 2017; Geneva; (the Joint Video Exploration Team of ISO/IEC JTC1/SC29/WG11 and ITU-T SG.16); URL: http://phenix.int-evry.fr/jvet/20170107 (16 pages).

AHG8: Algorithm description of projection format conversion in 360Lib Authors: He Y, Xiu X, Ye (InterDigital) Y, Zakharchenko V, Singh A, Dsouza (Samsung) A, C-C Huang, J-L Lin (MediaTek), Sun Y, Lu A, Yu (Zhejiang Univ) L, Van der Auwera (Qualcomm) G, Zhang C, Lu (OwlReality) Y Publication data: 5. JVET meeting; Dec. 1, 2017-Jan. 20, 2017; Geneva; (the Joint Video Exploration Team of ISO/IEC JTC1/SC29/WG11 and ITU-T SG.16 ); URL: http://phenix.int-evry.fr/jvet/,,Jan. 4, 2017 (15 pages).

International Search Report and Written Opinion for PCT/US2017/067736 dated Mar. 19, 2018, 17 pages.

Tarek El-Ganainy, "Streaming Virtual Reality Content"; arxiv.org, Cornell University Library, Dec. 26, 2016 (Year: 2016) 201 Olin Library Cornell University Ithaca, NY 14853, XP080742938 (8 pages).

* cited by examiner

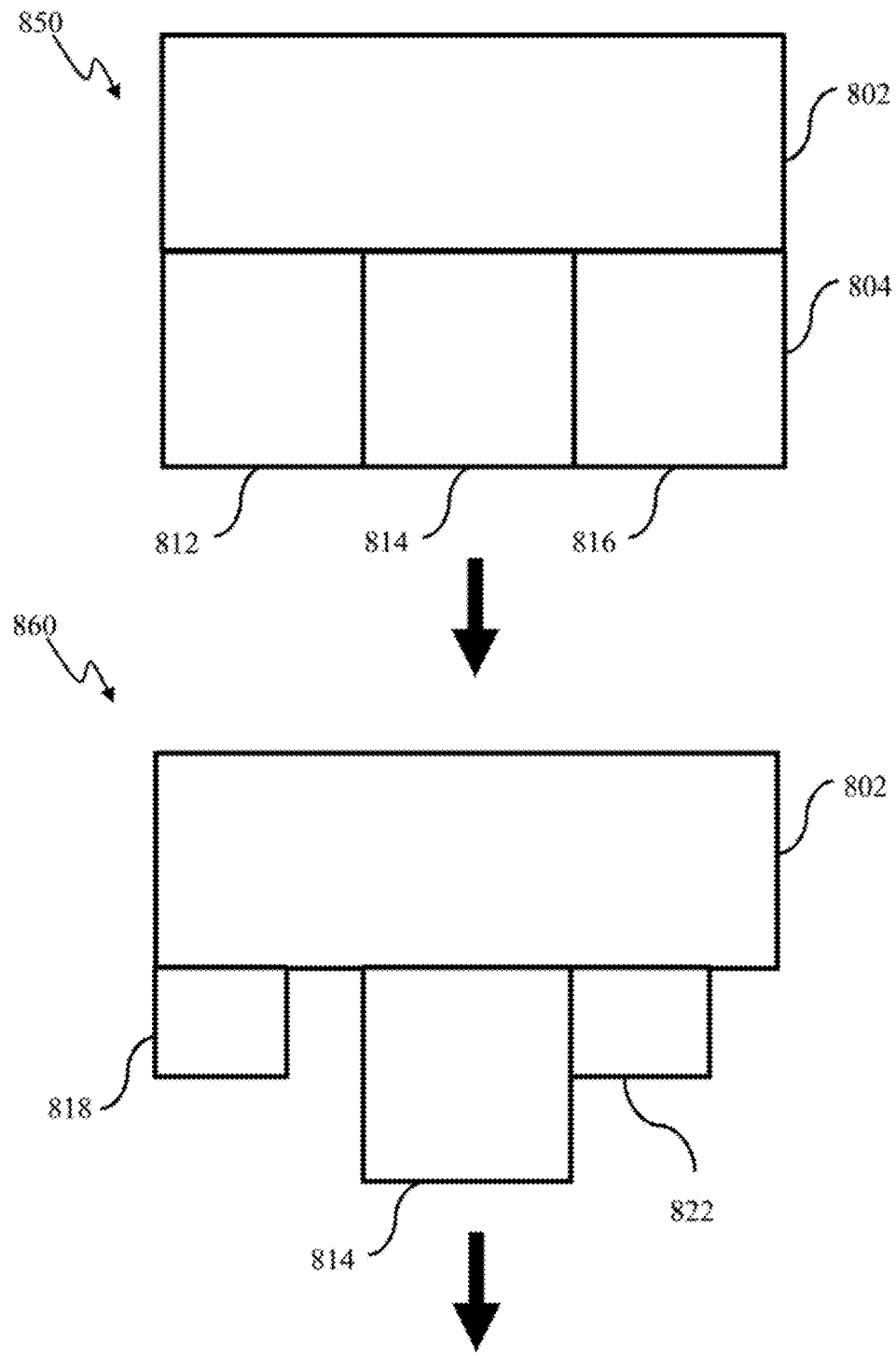
TO FIG. 8E          FIG. 8D

METHODS AND APPARATUS FOR PROVIDING A FRAME PACKING ARRANGEMENT FOR PANORAMIC CONTENT

PRIORITY

This application is a continuation of and claims the benefit of priority to U.S. patent application Ser. No. 15/665,202 filed Jul. 31, 2017 of the same title, issuing as U.S. Pat. No. 10,560,682 on Feb. 11, 2020, which claims the benefit of priority to U.S. Provisional Patent Application Ser. No. 62/477,936 filed Mar. 28, 2017 of the same title; U.S. Provisional Patent Application Ser. No. 62/473,952 filed Mar. 20, 2017 of the same title; U.S. Provisional Patent Application Ser. No. 62/465,678 filed Mar. 1, 2017 of the same title; U.S. Provisional Patent Application Ser. No. 62/462,804 filed Feb. 23, 2017 of the same title; and U.S. Provisional Patent Application Ser. No. 62/446,297 filed Jan. 13, 2017 and entitled "Methods and Apparatus for Rotated Sphere Projections", each of the foregoing being incorporated herein by reference in its entirety.

RELATED APPLICATIONS

This application is related to U.S. patent application Ser. No. 15/289,851 filed Oct. 10, 2016 and entitled "Apparatus and Methods for the Optimal Stitch Zone Calculation of a Generated Projection of a Spherical Image", which is incorporated herein by reference in its entirety.

This application is also related to U.S. patent application Ser. No. 15/234,869 filed Aug. 11, 2016 and entitled "Equatorial Stitching of Hemispherical Images in a Spherical Image Capture System", which claims the benefit of priority to U.S. Provisional Patent Application Ser. No. 62/204,290 filed on Aug. 12, 2015, each of the foregoing being incorporated herein by reference in its entirety.

This application is also related to U.S. patent application Ser. No. 15/406,175 filed Jan. 13, 2017 and entitled "Apparatus and Methods for the Storage of Overlapping Regions of Imaging Data for the Generation of Optimized Stitched Images", which is also incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to video image processing and in one exemplary aspect, to methods and apparatus for providing a frame packing arrangement for panoramic, 360° or virtual reality (VR) images using, for example, extant codecs.

Description of Related Art

Panoramic images (e.g., spherical images) are typically obtained by capturing multiple images with overlapping fields of view from different cameras and combining ("stitching") these images together in order to provide, for example, a two-dimensional projection for use with modern display devices. Converting a panoramic image to a two-dimensional projection format can introduce some amount of distortion and/or affect the subsequent imaging data. However, two-dimensional projections are desirable for compatibility with existing image processing techniques and also for most user applications. In particular, many encoders and compression techniques assume traditional rectangular image formats.

Incipient interest into different projections and applications has sparked research into a number of possible projection formats. Examples of prior art projection formats include without limitation e.g., equirectangular, cubemap, equal-area, octahedron, icosahedron, truncated square pyramid, and segmented sphere projection. For each of these projection formats, multiple facet (also called frame packing) arrangements are possible. A selection of prior art projections are described within e.g., "*AHG8: Algorithm description of projection format conversion in 360Lib*", published Jan. 6, 2017, to the Joint Video Exploration Team (JVET) of ITU-T SG 16 WP 3 and ISO/IEC JTC 1/SC 29/WG 11, the contents of which being incorporated herein by reference in its entirety.

While techniques exist that enable the encoding/decoding of this so-called panoramic content, extant frame packing arrangement techniques for these panoramic images may prove sub-optimal, especially in the context of pre-existing codecs. For example, the encoding/decoding of panoramic images using pre-existing codecs may result in, inter alia, increased processing overhead, lack of adequate bandwidth (bitrate) considerations, decreased compression efficiencies, lack of resolution or high battery utilization associated with the encoding and decoding processes.

SUMMARY

The present disclosure satisfies the foregoing needs by providing, inter alia, methods and apparatus for providing a frame packing arrangement for panoramic images using, inter alia, extant codecs.

In one aspect, an encoder apparatus is disclosed. In one embodiment, the encoder apparatus is configured to encode Segmented Sphere Projections (SSP) imaging data and/or Rotated Sphere Projections (RSP) imaging data into an extant imaging format.

In one variant, the encoder apparatus is configured to encode SSP imaging data and/or RSP imaging data into a pixel width of the extant imaging format.

In another variant, the encoder apparatus is configured to encode an equirectangular projection (ERP) into a first pixel width of the extant imaging format and encode either fisheye projection imaging data or RSP polar imaging data into a second pixel width of the extant imaging format.

In yet another variant, the fisheye projection imaging data or RSP polar imaging data is segmented and disposed within the second pixel width of the extant imaging format.

In yet another variant, the fisheye projection imaging data or RSP polar imaging data is segmented into two halves of circle, with the two halves of the circle disposed adjacent to one another in the second pixel width.

In yet another variant, the hemispherical half of the segmented halves is disposed along a bottom portion of the second pixel width furthest from the first pixel width.

In yet another variant, the hemispherical half of the segmented halves is disposed along a top portion of the second pixel width closest to the first pixel width.

In yet another variant, the hemispherical half of the segmented halves is disposed such that the hemispherical halves alternate in orientation within the second pixel width.

In yet another variant, the imaging data includes stereo imaging data, the stereo imaging data including left imaging data and right imaging data.

In yet another variant, the stereo imaging data further includes left and right polar imaging data.

In yet another variant, the extant imaging format includes a pixel width and a pixel depth, the stereo imaging format configured to run an extent of the pixel width.

In yet another variant, a frame packing arrangement for the extant imaging format first includes left imaging data, followed by left polar imaging data, followed by right imaging data, followed by right polar imaging data.

In yet another variant, the right imaging data is inverted and reversed with respect to the left imaging data.

In yet another variant, the right imaging data is only inverted with respect to the left imaging data.

In yet another variant, the right imaging data is only reversed with respect to the left imaging data.

In yet another variant, the left and right polar imaging data is substantially identical, and the frame packing arrangement is configured to obviate either of the left or the right polar imaging data in response to a received signal.

In yet another variant, the extant imaging format includes a 4K imaging format having a pixel width of 4,096 pixels and a pixel depth up to 2,048 pixels.

In yet another variant, the encoded image includes an RSP-3×2 or RSP-2×3 imaging format.

In another embodiment, the encoder apparatus includes an image capture device, the image capture device configured to capture panoramic content; a stitching module configured to generate a first projection that includes a front panoramic portion, a right-side panoramic portion, and a left-side panoramic portion from the captured panoramic content, the stitching module further configured to generate a second projection that includes a back panoramic portion, a top panoramic portion, and a bottom panoramic portion from the captured panoramic content; a first encoder configured to encode the first projection; and a second encoder configured to encode the second projection.

In one variant, the first projection is representative of a first continuous portion of the captured panoramic content.

In another variant, the second projection is representative of a second continuous portion of the captured panoramic content.

In yet another variant, the generated first projection includes redundant imaging data with the generated second projection and the encoder apparatus is further configured to black out a portion of the redundant imaging data, the blacked out portion configured to reduce a number of pixels associated with a combined first projection and the second projection as compared with a non-blacked out combined first projection and the second projection.

In yet another variant, the encoder apparatus is further configured to insert metadata information in the blacked out portion.

In yet another variant, the inserted metadata information is utilized for the stitching of the captured panoramic content for display on a computing device.

In yet another variant, the inserted metadata information is utilized for determination of a particular encoding format configuration of a plurality of encoding format configurations.

In a second aspect, a decoder apparatus is disclosed. In one embodiment, the decoder apparatus is configured to decode SSP imaging data and/or RSP imaging data from an extant imaging format.

In one variant, the decoded image includes an RSP-3×2 or RSP-2×3 imaging format.

In a third aspect, and encoding/decoding apparatus is disclosed. In one embodiment, the encoding/decoding apparatus includes an image capture device, a stitching module, two or more encoders, two or more decoders, a transmission line, a reconstruction module and a display device.

In a fourth aspect, a method for encoding imaging data is disclosed. In one embodiment, the method includes encoding SSP imaging data and/or RSP imaging data into an extant imaging format.

In another embodiment, the imaging data includes a panoramic image and the method further includes obtaining a first equirectangular projection that includes a front panoramic portion, a right-side panoramic portion, and a left-side panoramic portion; cropping the first equirectangular projection to create a first cropped portion; obtaining a second projection that includes a back panoramic portion, a top panoramic portion, and a bottom panoramic portion; cropping the second projection to create a second cropped portion; and combining the first cropped portion with the second cropped portion in order to create a panoramic projection.

In one variant, the method further includes receiving a viewport position for the panoramic projection, the viewport position being indicative of a portion of the panoramic projection; determining that the entirety of the viewport position is located in either the first cropped portion or the second cropped portion; decoding either the first cropped portion or the second cropped portion based on the determining; and transmitting either the decoded first cropped portion or the decoded second cropped portion.

In another variant, the method further includes causing the display of either the transmitted decoded first cropped portion or the transmitted decoded second cropped portion.

In yet another variant, the method further includes blacking out portions of the panoramic projection, the blacked out portions of the panoramic projection comprising redundant imaging data.

In yet another variant, the blacking out portions of the panoramic projection includes blacking out corners of the first cropped portion and the second cropped portion.

In yet another variant, the blacking out portions of the panoramic projection includes blacking out portions internal to corners of the first cropped portion and the second cropped portion.

In yet another variant, the blacking out portions of the panoramic projection includes only blacking out the second cropped portion of the panoramic projection, while not blacking out the first cropped portion of the panoramic projection.

In yet another variant, the method further includes inserting metadata information into the blacked out portions of the panoramic projection.

In yet another variant, the method further includes an RSP-3×2 or RSP-2×3 imaging format.

In a fifth aspect, a method of apportioning black areas within a target projection is disclosed.

In a sixth aspect, a method for creating a target panoramic projection is disclosed. In one embodiment, the method includes obtaining panoramic content in a source projection, splitting the obtained panoramic content into a first portion and a second portion, selecting a first target projection for the first portion and cropping the first target projection, selecting a second target projection for the second portion and cropping the second target projection, and combining the first cropped portion with the second cropped portion in order to create a target panoramic projection.

In a seventh aspect, a method for decoding and displaying a target panoramic projection is disclosed. In one embodiment, the method includes receiving the target panoramic projection that includes a first cropped portion and a second cropped portion, receiving a viewport position associated with the target panoramic projection, decoding the first cropped portion and/or the second cropped portion in accordance with the received viewport position, transmitting the decoded first cropped portion and/or the decoded second cropped portion, and causing the display of the transmitted portion(s) on a display device.

In an eight aspect, a method for adjusting the quantization parameter of one or both of the two image facets of a rotated sphere projection is disclosed. In one embodiment, the method includes obtaining panoramic content in a rotated sphere projection, determining whether to adjust a quantization parameter for one of the two image facets for the rotated sphere projection, determining whether to adjust a quantization parameter for the other one of the two image facets for the rotated sphere projection and adjusting one or both of the two image facets quantization parameter.

In a ninth aspect, a method for transmitting panoramic content in a rotated sphere projection that has been optimized for streaming applications is disclosed. In one embodiment, the method includes obtaining panoramic content in a rotated sphere projection, determining whether or not to downsample one or more portions of the rotated sphere projection, determining whether or not to rearrange the downsampled one or more portions, and transmitting the content in the rotated sphere projection.

In a tenth aspect, a method for decoding imaging data is disclosed. In one embodiment, the method includes decoding SSP imaging data and/or RSP imaging data from an extant imaging format.

In one variant, the method includes an RSP-3×2 or RSP-2×3 imaging format.

In an eleventh aspect, a computer-readable storage apparatus is disclosed. In one embodiment, the computer-readable storage apparatus includes a storage medium comprising computer-readable instructions, the computer-readable instructions being configured to, when executed by a processor apparatus, to perform at least a portion of the aforementioned methodologies described herein.

In another embodiment, the computer-readable storage apparatus includes a storage medium comprising computer-readable instructions, the computer-readable instructions being configured to, when executed by a processor apparatus to decode SSP imaging data and/or RSP imaging data from an extant imaging format.

In yet another embodiment, the computer-readable storage apparatus includes a storage medium comprising computer-readable instructions, the computer-readable instructions being configured to, when executed by a processor apparatus: obtain a first projection that includes a front panoramic portion, a right-side panoramic portion, and a left-side panoramic portion; obtain a second projection that includes a back panoramic portion, a top panoramic portion, and a bottom panoramic portion; and combine the first projection with the second projection in order to create a panoramic projection.

In one variant, the computer-readable instructions are further configured to, when executed by the processor apparatus: receive a viewport position for the panoramic projection, the viewport position being indicative of a portion of the panoramic projection; determine that the entirety of the viewport position is located in either the first projection or the second projection; decode either the first projection or the second cropped portion based on the determination; and transmit either the decoded first projection or the decoded second projection.

In another variant, the computer-readable instructions are further configured to, when executed by the processor apparatus: cause the display of either the transmitted decoded first projection or the transmitted decoded second projection.

In yet another variant, the computer-readable instructions are further configured to, when executed by the processor apparatus: black out portions of the panoramic projection, the blacked out portions of the panoramic projection including redundant imaging data.

In yet another variant, the computer-readable instructions are further configured to, when executed by the processor apparatus: insert metadata information into the blacked out portions of the panoramic projection.

In a twelfth aspect, an integrated circuit (IC) apparatus is disclosed. In one embodiment, the IC apparatus is configured to perform at least a portion of the aforementioned methodologies described herein.

In a variant, the integrated circuit apparatus is configured to encode SSP imaging data and/or RSP imaging data into an extant imaging format.

In another variant, the integrated circuit apparatus is configured to decode SSP imaging data and/or RSP imaging data from an extant imaging format.

In a thirteenth aspect, a computing device is disclosed. In one embodiment, the computing device is configured to perform at least a portion of the aforementioned methodologies described herein.

In one variant, the computing device is configured to encode and/or decode SSP imaging data and/or RSP imaging data to/from an extant imaging format.

In a variant, the computing device is configured to display the decoded SSP imaging data and/or RSP imaging data.

In another variant, the imaging format includes an RSP-3×2 or RSP-2×3 imaging format.

Other features and advantages of the present disclosure will immediately be recognized by persons of ordinary skill in the art with reference to the attached drawings and detailed description of exemplary implementations as given below.

BRIEF DESCRIPTION OF THE DRAWINGS

FIG. 5I is a graphical representation of another exemplary RSP 3×2 frame packing arrangement illustrating redundant imaging data being blacked out from the frame, useful in describing the principles of the present disclosure.

FIG. 8D is a graphical representation of the exemplary RSP frame packing arrangement of FIG. 8A in which portions of the bottom facet have been downsampled, useful in describing the principles of the present disclosure.

Figure 1A:
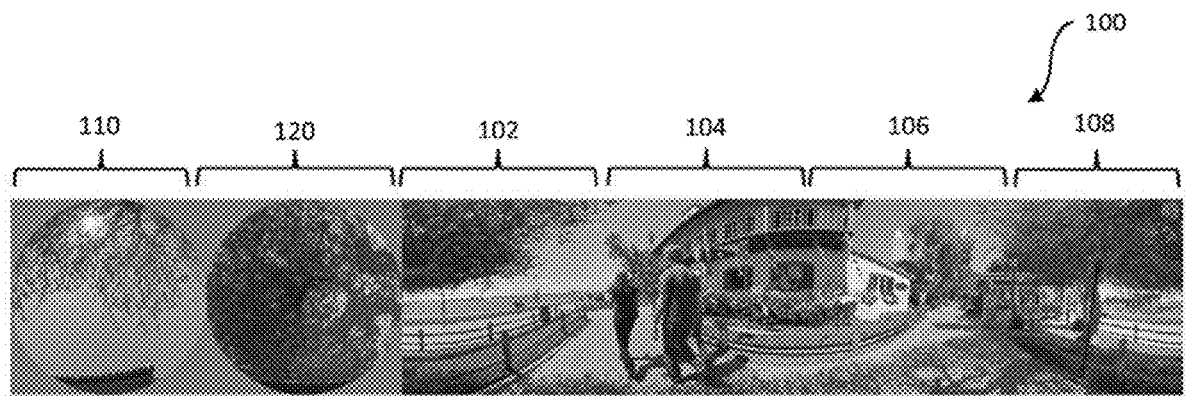
FIG. 1A is a graphical representation of an exemplary Segmented Sphere Projection in a 6×1 arrangement (SSP-6×1), useful in describing the principles of the present disclosure.

All Figures disclosed herein are © Copyright 2017 GoPro, Inc. All rights reserved.

DETAILED DESCRIPTION

Implementations of the present technology will now be described in detail with reference to the drawings, which are provided as illustrative examples and species of broader genus' so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

Moreover, while implementations described herein are primarily discussed in the context of frame packing arrangements for so-called Segmented Sphere Projections (SSP) and Rotated Sphere Projections (RSP) such as that described in co-owned and co-pending U.S. Provisional Patent Application Ser. No. 62/446,297 filed Jan. 13, 2017 and entitled "Methods and Apparatus for Rotated Sphere Projections", U.S. Provisional Patent Application Ser. No. 62/465,678 filed Mar. 1, 2017 and entitled "Methods and Apparatus for Providing a Frame Packing Arrangement for Panoramic Content", and U.S. Provisional Patent Application Ser. No. 62/473,952 filed Mar. 20, 2017 and entitled "Methods and Apparatus for Providing a Frame Packing Arrangement for Panoramic Content", the contents of each of the foregoing incorporated supra, it is readily appreciated that the principles described herein can be equally applied to other projection formats. For example, the frame packing arrangements described herein may be readily applied to other types of projections for panoramic content (e.g., 360°) that may have an asymmetric face layout including, for example, those projections and techniques described in co-owned and co-pending U.S. patent application Ser. No. 15/289,851 filed Oct. 10, 2016 and entitled "Apparatus and Methods for the Optimal Stitch Zone Calculation of a Generated Projection of a Spherical Image", the contents of which were incorporated supra.

Additionally, while primarily discussed in the context of encoding and decoding of 4K image resolutions having a variety of aspect ratios (e.g., 4,096×2,048 pixels), it would be readily appreciated by one of ordinary skill given the contents of the present disclosure that the principles described herein may be readily applied to other imaging formats and aspect ratios. For example, the principles described herein may be readily applied to various display resolutions including, for example, high definition (HD) variants, 4K variants, 8K variants, and the like, and at a variety of differing display aspect ratios (e.g., 4:3 and 16:9 aspect ratios, etc.) for various ones of these aforementioned display resolutions.

While examples of the present disclosure are presented within the context of static photography, artisans of ordinary skill in the related arts will readily appreciate that the various principles described herein may be equally applied to a wide range of imaging applications, including e.g., video capture, video rendering, virtual reality (VR), augmented reality (AR) and the like. For example, a panoramic image can be generated from a video capture while rotating a camera (e.g., stitching together the individual frames in time as different fields of view (FOV)). Similarly, source images may be dynamically stitched together during a video playback (e.g., for virtual reality (VR), augmented reality (AR) applications, mixed reality, augmented virtuality, and/or other hybridized realities).

These and other variations would be readily apparent to one of ordinary skill given the contents of the present disclosure.

Exemplary Frame Packing Arrangement for Projections—

Figure 1B:
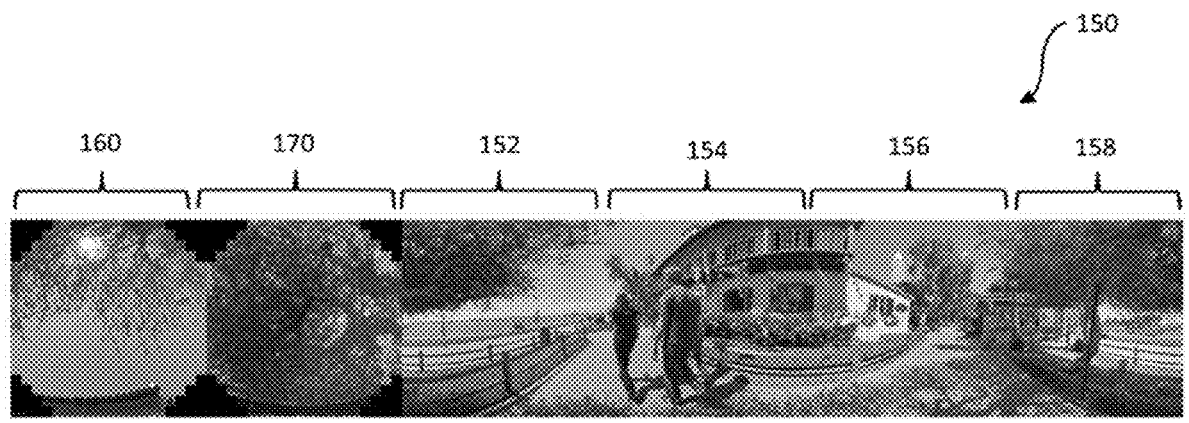
FIG. 1B is a graphical representation of an exemplary Rotated Sphere Projection in a 6×1 arrangement (RSP-6×1), useful in describing the principles of the present disclosure.

FIG. 1A illustrates an exemplary frame of SSP imaging data 100. SSP may have four (4) faces 102, 104, 106, 108 which may be directly derived from an Equirectangular Projection (ERP), while the faces 110, 120 representing the poles of the image (e.g., top 110 and bottom 120 images) may be different from the aforementioned ERP. As illustrated in FIG. 1A, the top 110 and bottom 120 of the images are each depicted in a fish eye projection. FIG. 1B illustrates an exemplary frame of RSP imaging data 150. As used herein, the term rotated sphere projection or RSP includes a projection that uses some portions of the image from an original non-rotated image (using any projection), while using other portions of the original non-rotated image after applying a spherical rotation and re-projection onto the original or any other projection. For example, and similar to the depicted SSP image, RSP may also have four (4) faces 152, 154, 156, 158 which may be directly derived from an ERP that runs along the equator. However, unlike the SSP image 100 of FIG. 1A, the top 160 and bottom 170 images illustrated in FIG. 1B are derived by altering the ERP projection such that the equator in the four (4) faces has been rotated such that it now runs along the meridian of the spherical image. Accordingly, by moving the north and south (top 160 and bottom 170) polar regions of the image to the new "equator" (meridian) of the altered ERP projection, the top 160 and bottom 170 images can be sampled and reproduced with minimal distortion (as compared with, for example, the aforementioned SSP frame).

The aforementioned SSP and RSP projections have a number of advantages over other prior techniques including possessing a better compression efficiency when encoding the image. For example, because both the SSP and RSP projections may be closer geometrically to the captured spherical image, they can be reproduced with a lesser amount of geometric distortion and with fewer face discontinuities as compared with other geometric projections (e.g., cubic, octahedron, icosahedron, and the like). Additionally, and as discussed in additional detail infra, they often perform better on extant codec tests than at least some of the aforementioned other geometric projections. Additionally, these SSP and RSP projections may be represented with, for example, a 25% reduction in the number of coded pixels and hence, may be transmitted at a higher resolution (or alternatively at a reduced bandwidth/bit-rate for a given image quality and/or other bandwidth considerations) by using, for example, extant codec architectures as compared with at least some of the aforementioned other geometric projections.

The SSP imaging data 100 of FIG. 1A and RSP imaging data 150 of FIG. 1B as illustrated possesses an aspect ratio of 6:1. Accordingly, in the context of an exemplary 4K frame of imaging data (i.e., 4,096×2,048 pixels), the SSP imaging data 100 and RSP imaging data 150 may have an overall pixel size of 6,144×1,024 pixels. This wide aspect ratio for the SSP imaging data 100 and RSP imaging data 150 have a number of readily identifiable deficiencies. First, and in the exemplary context of 4K frames of imaging data, most (if not all) already deployed codecs are designed to handle at most a single frame of 4K data at a time. Accordingly, many existing 4K codec line buffers are designed such that the pixel width of the image does not exceed 4,096 pixels. Additionally, with the aforementioned 4K codec line buffer limitations notwithstanding, the wide 6:1 aspect ratio is often not well suited for consumption in a "raw" format on, for example, 16:9 aspect ratio monitors, television sets, and smartphone screens. As a result, a viewer of the wide 6:1 aspect ratio content may not be able to view the content in high resolution as the width of modern display devices often becomes a limiting factor. Additionally, wider aspect ratios (such as the aforementioned 6:1 aspect ratio) may not lend well to some parallel processing tools. For example, this aforementioned 6:1 aspect ratio may not be suitable for so-called slices in H.264/AVC. Many common multi-slice implementations of H.264 encoders may split a 6:1 aspect ratio frame into thin rectangular slices, which may be inefficient from a compression perspective. As a brief aside, slices may tend to be more efficient for the purposes of encoding when they are more square in aspect ratio.

Figure 1C:
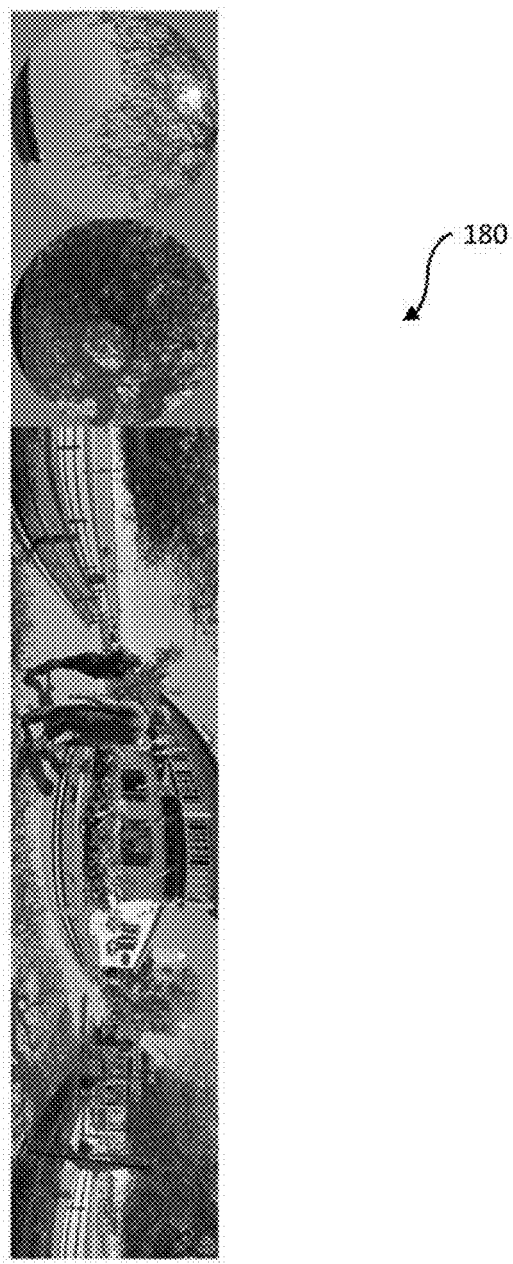
FIG. 1C is a graphical representation of an exemplary Segmented Sphere Projection in a 1×6 arrangement (SSP-1×6) for use with existing codecs, useful in describing the principles of the present disclosure.

Referring now to FIG. 1C, one such SSP imaging data 180 approach for overcoming, inter alia, the aforementioned 4K line buffer limitations is illustrated. As can be seen, the SSP data 180 has been rotated by 90° so that it now resides in a 1:6 aspect ratio (e.g., 1,024×6,144 pixels). While the line buffer limitations have been addressed with the SSP imaging data 180 of FIG. 1C, this 1:6 aspect ratio may look even worse with modern display devices (when looking at the raw imaging data). For some modern displays (such as e.g., smart phones), this may be a suitable approach when the phone is held in portrait mode (as opposed to being held in landscape mode). However, the content will appear rotated and may not be aesthetically pleasing when looking at the raw imaging data. Additionally, image post processing methodologies for the imaging format for FIG. 1C may also need to apply a rotation to the images, which may result in additional processing resources being required at, for example, the image encoder and/or image decoder. The substitution of RSP imaging data in a 1:6 aspect ratio may also possess similar disadvantages.

Additionally, the SSP imaging data 180 depicted in FIG. 1C may have problems in terms of compression efficiency for extant codecs. For example, many existing codecs are designed to handle content in a wider aspect ratio (with more horizontal as opposed to vertical motion (e.g., camera pans)). Accordingly, this tall and rotated orientation as illustrated in FIG. 1C may result in sub-optimal codec performance. Additionally, using a 1:6 aspect ratio image may mean that the codec pipeline may be sub-optimally used (which in the context of 4K display resolutions was designed to handle 4K line buffers). This may result in worse performance as there are now more vertical lines to process (e.g., worst case processing of these images may be equivalent to processing a 4,096×6,144 image).

Figure 2:
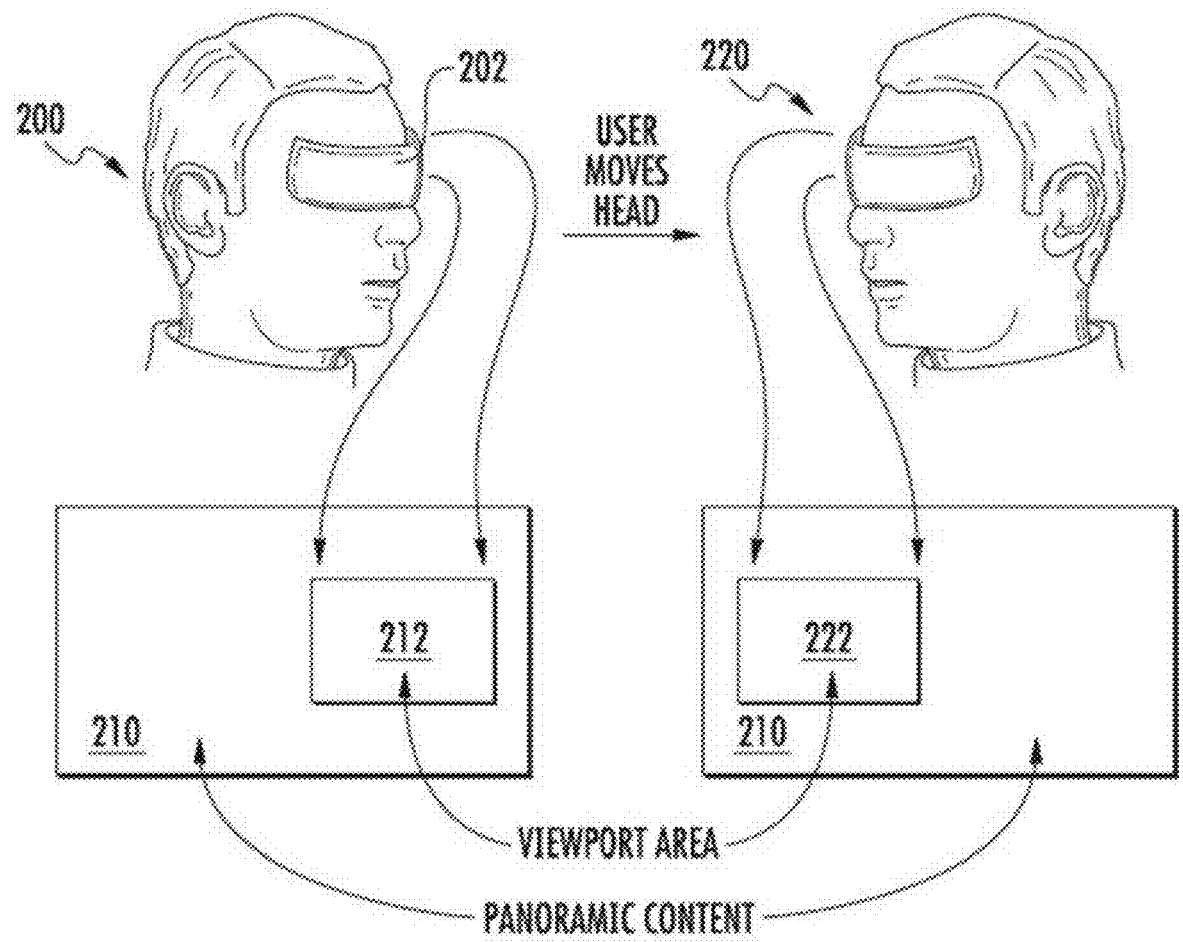
FIG. 2 is a graphical illustration depicting viewport change when viewing panoramic content in accordance with the principles of the present disclosure.

As a brief aside, FIG. 2 illustrates viewport change when viewing panoramic content (such as the panoramic content described with reference to FIGS. 1A-1C as well as the panoramic content described in the various frame packing arrangements discussed infra), in accordance with one implementation. In some implementations a user may view panoramic content using a virtual reality (VR) headset, 202 in FIG. 2. Headset 202 may include a sensor component configured to provide information related to orientation and/or motion of headset 202. In some implementations, the sensor component may include an accelerometer, a tilt sensor, a compass, a heading sensor, a gyroscope, and/or other sensors.

When headset 202 is pointed in a given direction, for example, as shown in panel 200 in FIG. 2, the viewport associated with the position of headset 202 may be denoted by area 212 within the panoramic image frame 210. As used herein the terms "viewport" and/or "view area" may be used to describe a portion of a view field that may be used for viewing panoramic content that may be characterized by a content view field (e.g., shown by frame 210 in FIG. 2). When panoramic content is presented on a two dimensional display device, the viewport may denote a two dimensional area (e.g., area 212) within the 2-dimensional projection of the acquired panoramic content (e.g., frame 210).

When providing a portion of the panoramic content (e.g., a viewport 212) to a client device, a portion of the content corresponding to the present viewport may be encoded, transmitted, and/or decoded to reduce load on a content server, transmission resource (e.g., bandwidth, energy) utilization, and/or client device decoder load. Viewport changes may necessitate content bitstream adjustment. By way of an illustration, as the head of a user moves from configuration 200 to configuration 220 in FIG. 2, the viewport may change, e.g., from area 212 to area 222 within the panoramic content frame 210. Accordingly, the content providing entity (e.g., content server) may need to transition from providing bitstream from content within the area 212 to content associated with the area 222.

Mono Configuration Frame Packing

Referring now to FIGS. 3A-3E, exemplary implementations of frame packing arrangements for mono captured images are shown and described in detail. In the context of capturing, the term "mono" as used herein may refer to the fact that a significant portion of a captured 360° image is captured without significant overlap, hence perception of depth is not reproduced. In the context of streaming and playback, the term "mono" may also refer to the fact that both the left and right eyes see the same images during content consumption. As discussed elsewhere herein, panoramic images (e.g., spherical images) are typically obtained by capturing multiple images with overlapping fields of view from different cameras and combining ("stitching") these images together in order to provide, for example, a two-dimensional projection for use with modern display devices. Additionally, panoramic images may be obtained by capturing multiple images with overlapping fields of view with a single camera that is rotated about a two-dimensional axis, or three-dimensional axes. These stitched images may be captured using the aforementioned mono image capturing techniques, or alternatively may be captured using stereoscopy techniques for creating the illusion of depth in an image by means of capturing a given FOV with two (or more) image capturing devices, or by applying an offset in order to create two separate images from a single captured image. Stereo configuration frame packing will be described in subsequent detail herein with respect to FIGS. 4A-4F.

Figure 3A:
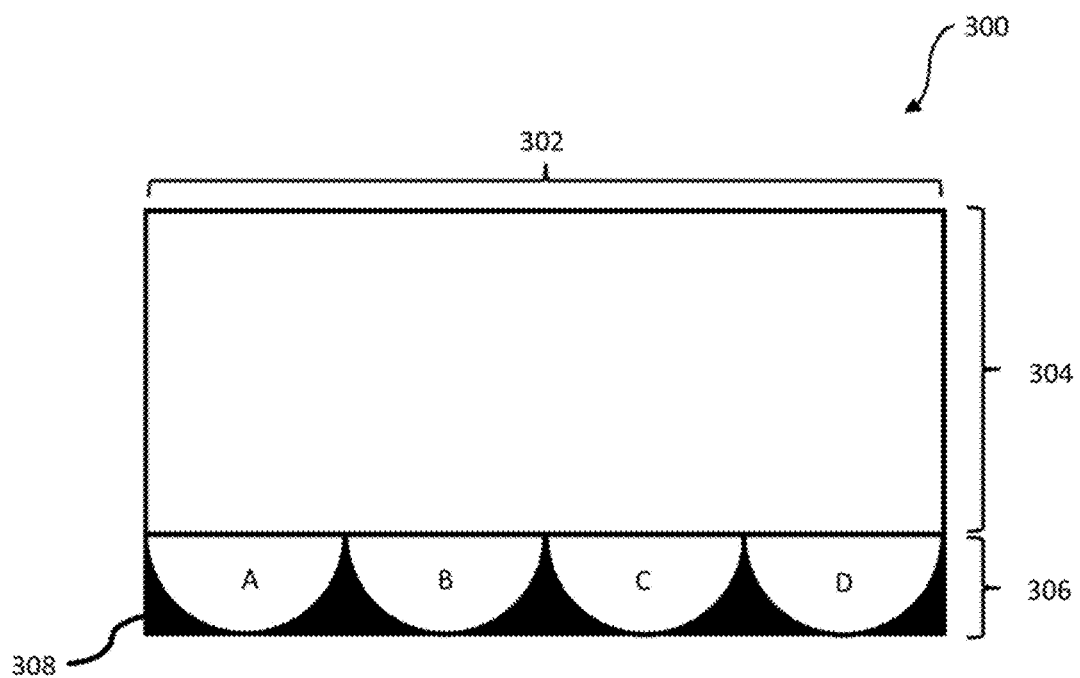
FIG. 3A is a graphical representation of a first exemplary embodiment of a frame packing arrangement for mono captured images, useful in describing the principles of the present disclosure.

FIG. 3A illustrates one such exemplary frame packing configuration 300 for the packing of a frame of, for example, SSP and/or RSP imaging data. In some implementations, the ERP portion of the SSP or RSP imaging data will be stored in a frame packing width 302 and will have a frame packing depth 304. The circular faces of the SSP imaging data (e.g., faces 110, 120 in FIG. 1A), or the RSP imaging data (e.g., faces 160, 170 in FIG. 1B) will be segmented and stored in the frame packing width 302 and will have a frame packing depth 306. Additionally, the circular faces of the SSP imaging data, or the RSP imaging data are oriented such that more of the pixels associated with these circular faces are closer to the pixels of, for example, the ERP portion, thereby making them more efficient from a caching perspective in some implementations.

In the exemplary context of the aforementioned 4K imaging resolution, the frame packing width 302 may have a pixel width of 4,096 pixels, the frame packing depth 304 may have a pixel depth of 1,024 pixels, and the frame packing depth 306 may have a pixel depth of 512 pixels. Accordingly, the aspect ratio for this particular configuration will be 8:3 (e.g., an SSP 8:3 frame packing format or RSP 8:3 frame packing format). Herein lies one salient advantage of the frame packing configuration 300 depicted in FIG. 3A, namely the overall size of the frame packing configuration may have a 25% reduction in the pixels contained within a frame as compared with a native 4K resolution frame (i.e., 4,096 pixels×1,536 pixels as compared with 4,096 pixels× 2,048 pixels), thereby resulting in increased processing overhead savings as well as reduced bandwidth considerations during transmission/reception.

Referring again to the circular faces depicted in FIG. 3A, and in the exemplary context of a panoramic image captured using, for example, a two camera image capturing device arranged in a Janus configuration (e.g., in a back-to-back configuration), segmented portion A may refer to a portion of the image that is looking upwards and captured using a forward facing camera, while segmented portion B may refer to a portion of the image that is also looking upwards and captured using a rearward facing camera. Similarly, segmented portion C may refer to a portion of the image that is looking downwards and captured using a forward facing camera, while segmented portion D may refer to a portion of the image that is also looking downwards and captured using a rearward facing camera. While the discussion of a two camera image capturing device arranged in a Janus configuration, it will be readily appreciated by one of ordinary skill given the contents of the present disclosure, that other suitable image capturing devices (such as 6-axis image capturing devices, such as that described in co-owned and co-pending U.S. patent application Ser. No. 15/414,403 filed Jan. 24, 2017 and entitled "Systems and Methods for Compressing Video Content", the contents of which are incorporated herein by reference in its entirety), may be readily applied to the frame packing arrangements as disclosed herein.

In some implementations, the depicted dark region 308 may contain null data, thereby enabling reduced processing overhead for, inter alia, the encoding/decoding of frame packing configuration 300. Additionally, the null data may be enabled for reduced transmission bandwidth and lower bit rates. In alternative implementations, some or all of the depicted dark region 308 may include metadata information that may, for example, be utilized for the stitching of the captured panoramic for display on a computing device (such as computing device 1000 depicted in FIG. 10). Additionally, or alternatively, in some implementations, the depicted dark region 308 may include information that enables a decoder to determine the particular encoding format configuration chosen such as, for example, by determining which frame packing configuration 300, 320 (FIG. 3B), 340 (FIG. 3C) and the like has been utilized for the encoding process.

In some implementations, the depicted dark region 308 may include additional information such as that disclosed in co-owned and co-pending U.S. patent application Ser. No. 15/406,175 filed Jan. 13, 2017 entitled "Apparatus and Methods for the Storage of Overlapping Regions of Imaging Data for the Generation of Optimized Stitched Images", which is also incorporated herein by reference in its entirety. In one or more implementations, a decoder may utilize information contained within the depicted dark region 308 for the decoding/rendering of the frame, while, for example, legacy decoders may simply discard the data contained within dark region 308.

Figure 3B:
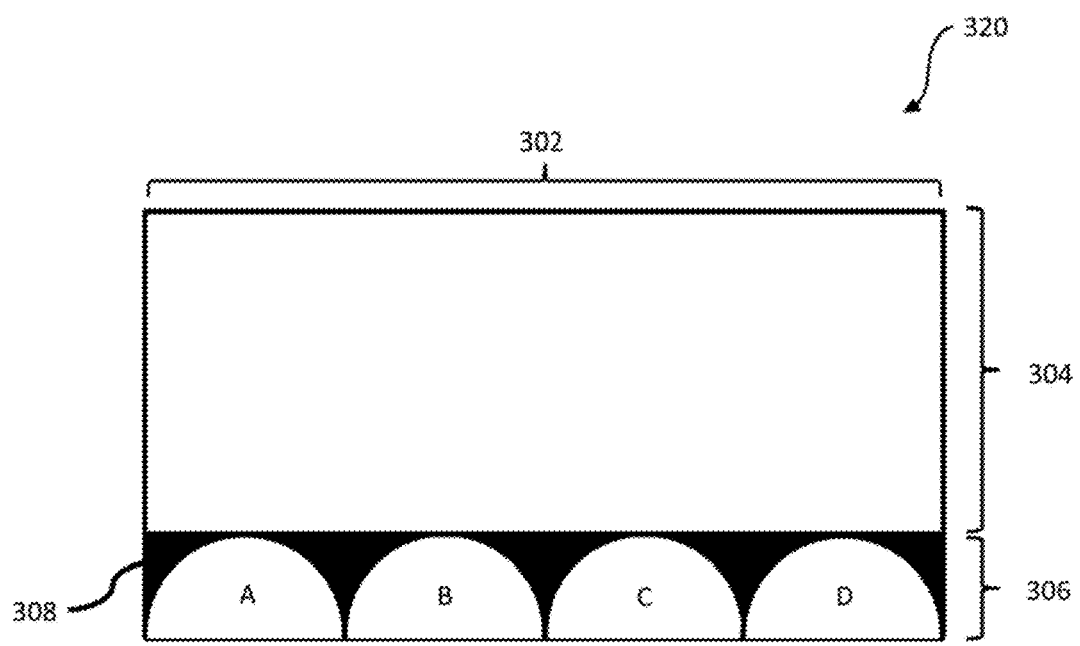
FIG. 3B is a graphical representation of a second exemplary embodiment of a frame packing arrangement for mono captured images, useful in describing the principles of the present disclosure.

Referring now to FIG. 3B, a second exemplary frame packing configuration 320 is illustrated. The frame packing configuration 320 may include several of the advantages described herein with reference to FIG. 3A; however, frame packing configuration 320 differs from that depicted in FIG. 3A in that the circular faces A, B, C, D of, for example, the SSP imaging data (e.g., faces 110, 120 in FIG. 1A), or the RSP imaging data (e.g., faces 160, 170 in FIG. 1B) may be inverted.

Figure 3C:
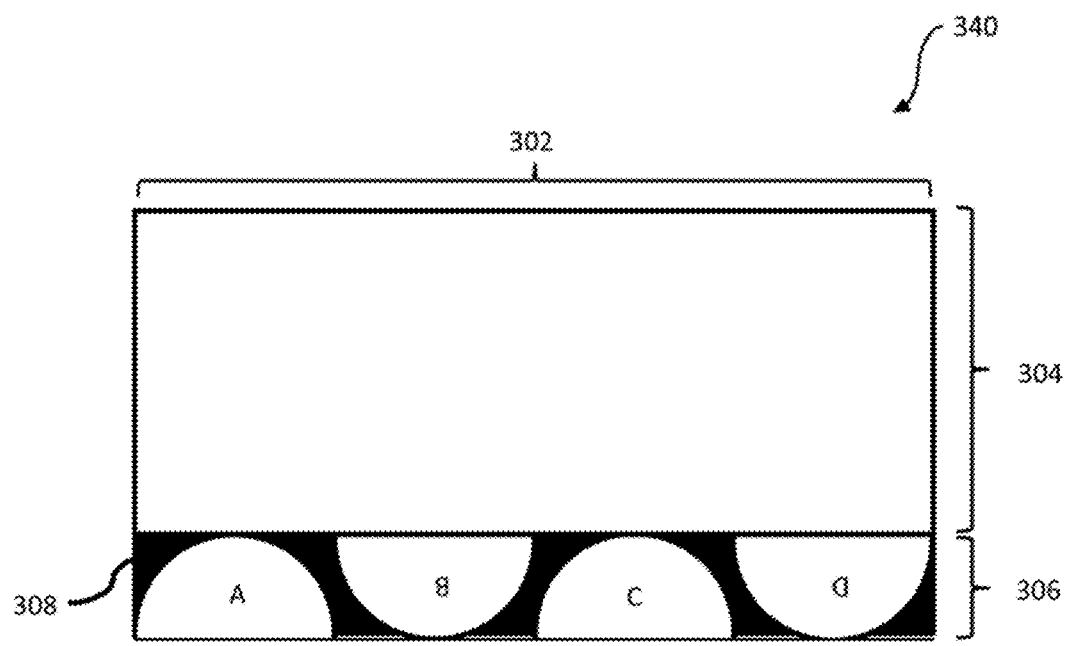
FIG. 3C is a graphical representation of a third exemplary embodiment of a frame packing arrangement for mono captured images, useful in describing the principles of the present disclosure.

Referring now to FIG. 3C, yet another exemplary frame packing configuration 340 is illustrated. Similar to the discussion of FIG. 3B supra, the frame packing configuration 340 of FIG. 3C may include several of the advantages described herein with reference to FIG. 3A; however, frame packing configuration 340 differs from that depicted in FIG. 3A in that the circular faces A, B, C, D of, for example, the SSP imaging data (e.g., faces 110, 120 in FIG. 1A), or the RSP imaging data (e.g., faces 160, 170 in FIG. 1B), may be alternately inverted.

For example, image portion A may be arranged similar with respect to image portion A within FIG. 3B, while image portion B may be arranged similar with respect to image portion B within FIG. 3A. Similarly, image portion C may be arranged similar with respect to image portion C within FIG. 3B, while image portion D may be arranged similar with respect to image portion D within FIG. 3A. In one or more implementations, the alternately inverted imaging portions A, B, C, D as depicted in FIG. 3C may be configured to enable improved compression efficiencies using, for example, existing compression methodologies. For example, an object detected within imaging portion A may travel predictably (e.g., in a same or similar motion trajectory) when this object may be depicted in imaging portion B in subsequent frame(s). Accordingly, the frame packing configuration 340 depicted in FIG. 3C may compress more efficiently as compared with for example, frame packing configuration 300 (FIG. 3A) and frame packing configuration 320 (FIG. 3B). Additionally, the frame packing arrangement of FIG. 3C may visually be the most natural, especially when the image capture device may be in motion (e.g., during direct viewing of the captured image(s)).

Each of the frame packing configurations 300, 320, 340 depicted in FIGS. 3A-3C may advantageously preserve line buffer requirements for existing codecs while simultaneously optimally using the line buffers of these existing codecs as compared with, for example, the depicted frame packing configurations depicted within FIGS. 1A-1C. Additionally, the aspect ratio of these frame packing configurations 300, 320, 340 (e.g., an 8:3 aspect ratio) may also facilitate multi-slice and multi-tile encoding techniques of the type known by one of ordinary skill in the encoding arts, as the aspect ratio is closer to a 1:1 aspect ratio as compared with, for example, the frame packing configurations illustrated in FIGS. 1A-1C. As a result, one may pack the same number of slices and tiles, which are typically squarer in shape, thereby achieving a higher compression efficiency during encoding as compared with, for example, the frame packing configurations illustrated in FIGS. 1A-1C.

Figure 3D:
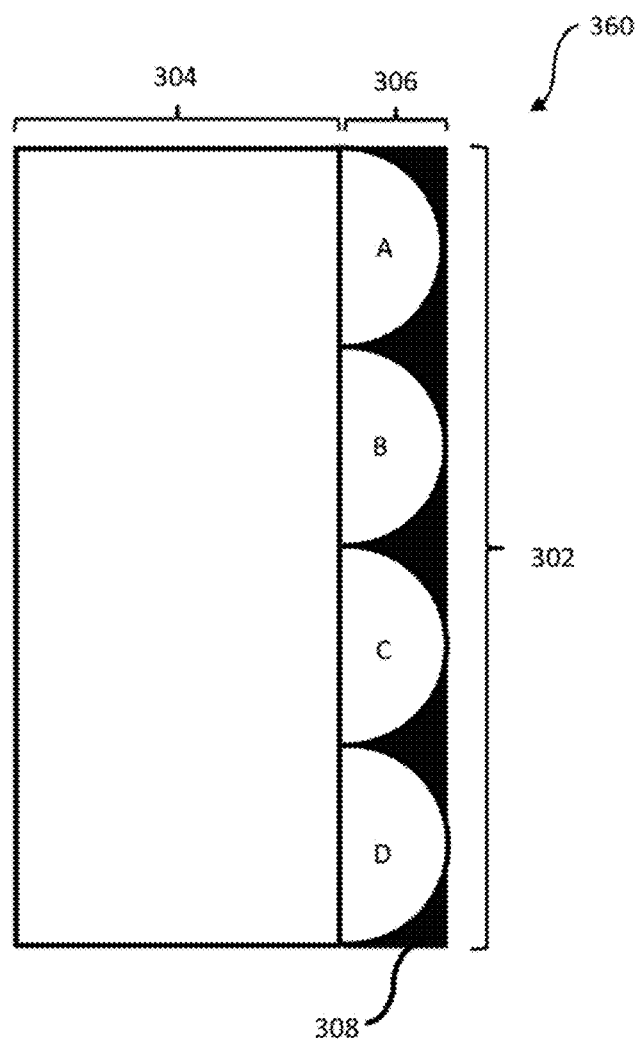
FIG. 3D is a graphical representation of a fourth exemplary embodiment of a frame packing arrangement for mono captured images, useful in describing the principles of the present disclosure.

FIG. 3D illustrates yet another exemplary frame packing configuration 360 for the packing of a frame of, for example, SSP and/or RSP imaging data. In the illustrated frame packing configuration 360, the frame has effectively been rotated by 90° in a counter-clockwise rotation as compared with, for example, the frame packing configuration 300 illustrated in FIG. 3A. The exemplary frame packing configuration 360 enables one to reduce the effective pixel width of the frame, at the expense of increased height.

Figure 3E:
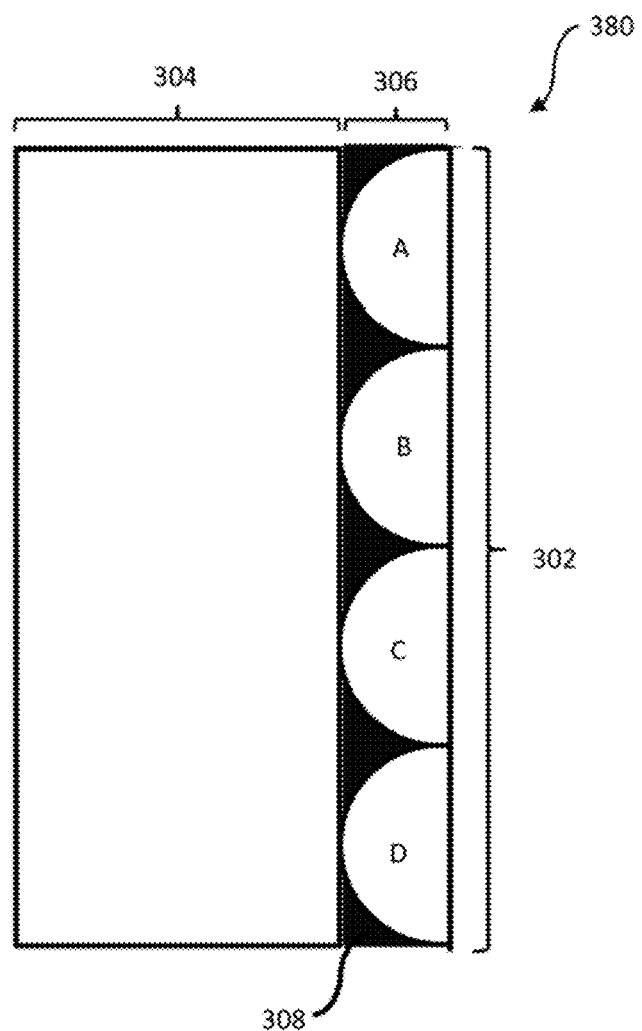
FIG. 3E is a graphical representation of a fifth exemplary embodiment of a frame packing arrangement for mono captured images, useful in describing the principles of the present disclosure.

In some implementations, such as in applications in which where there are line buffer processing limitations, the exemplary frame packing configuration 360 may have advantages, including being more well suited for particular types of line buffers. Additionally, the circular faces of the SSP imaging data, or the RSP imaging data are oriented such that more of the pixels associated with these circular faces are closer to the pixels of, for example, the ERP portion, thereby making them more efficient from a caching perspective in some implementations. As illustrated in FIG. 3E, the exemplary frame packing configuration 380 is similar to that shown in FIG. 3D; however, the circular faces of the SSP imaging data, or the RSP imaging data are oriented such that fewer of the pixels associated with these circular faces are closer to the pixels of, for example, the ERP portion, which may be advantageous in some implementations.

In the exemplary context of the aforementioned 4K imaging resolution, the frame packing width for the frame packing arrangements 360, 380, shown in respective FIGS. 3D and 3E will have a pixel width that is equivalent to the combined pixel width of pixel width 304 of 1,024 pixels and pixel width 306 of 512 pixels (i.e., a combined pixel width of 1,536 pixels). Moreover, the pixel depth 302, may have a pixel depth of 4,096 pixels. Accordingly, the aspect ratio for these particular configurations will be 3:8 (e.g., an SSP 3:8 frame packing format or RSP 3:8 frame packing format).

Stereo Configuration Frame Packing—

Referring now to FIGS. 4A-4F, exemplary implementations of frame packing arrangement for stereo captured images are shown and described in detail. As a brief aside, stereo imaging data may be used to create a sense of depth when viewing the stereo imaging data on, for example, a display device suitable for use in viewing stereo imaging data. One such exemplary stereo display device includes a head mounted display device that is configured to display right eye imaging data into the right eye of a user, while displaying left eye imaging data into the left eye of a user. This stereo imaging data may present two offset images to the left and right eye of user, respectively. These separate two-dimensional images are then combined in the brain of the viewer to give the viewer of this data the perception of three-dimensional depth. These stereo images are typically captured using an image capturing device that includes a plurality of cameras. Exemplary image capture devices for the capture of stereo imaging data include the Facebook® "Surround 360" camera rig and the Jaunt® "Jaunt One" camera rig. In order to capture panoramic images (e.g., 360° FOV and/or other panoramic FOV), the cameras located on the image capturing device capture stereo images along the equatorial plane of the image capturing device while capturing mono images along the poles (top and/or bottom) of the device. Additionally, the image capture devices may capture stereo imagery offset from the given equatorial plane (e.g., at 30°, 45°, 60°, etc.).

Figure 4A:
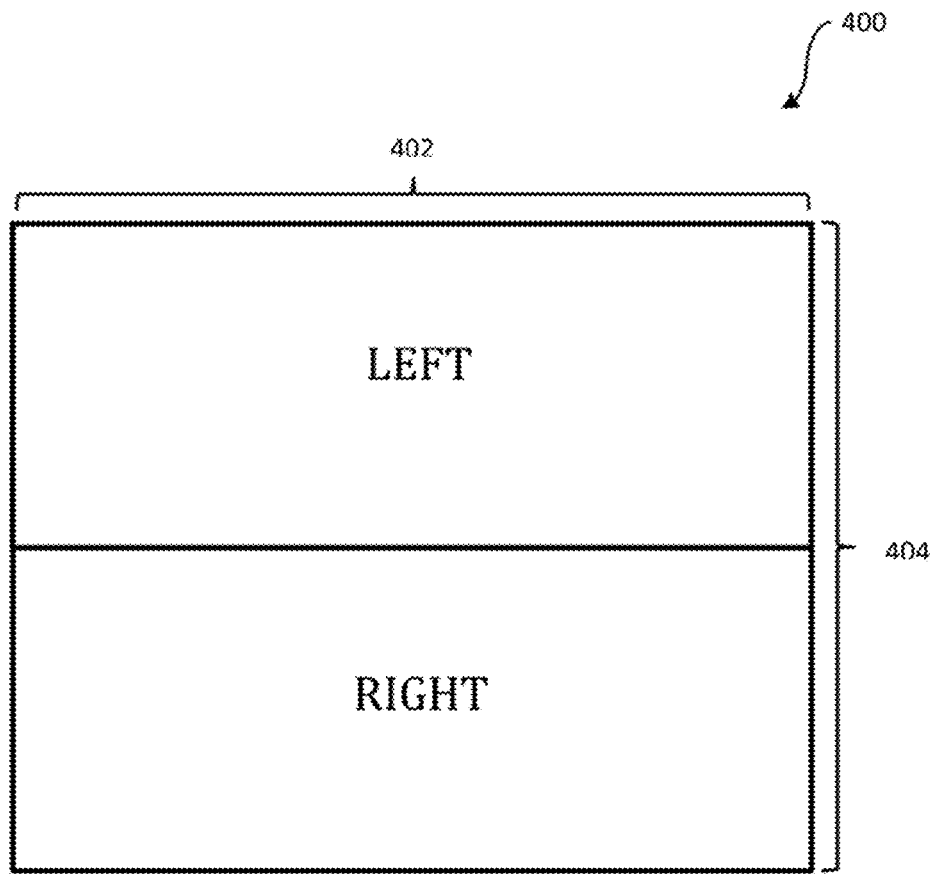
FIG. 4A is a graphical representation of a first exemplary embodiment of a frame packing arrangement for stereo captured images, useful in describing the principles of the present disclosure.

FIG. 4A depicts one exemplary frame packing arrangement 400 for the packing of stereo imaging data. For example, the Google® JUMP system arranges captured stereo imaging data in a format similar to that depicted in FIG. 4A. The frame packing arrangement 400 illustrated includes a pixel width 402 and a pixel depth 404 into which two separate ERP images are stacked one on top of the other (e.g., left imaging data on the top and right imaging data on the bottom, although it would be appreciated that the arrangement of this left and right imaging data may be reversed in alternative arrangements, including in the alternative frame packing arrangements depicted in FIGS. 4B-4F).

Figure 4B:
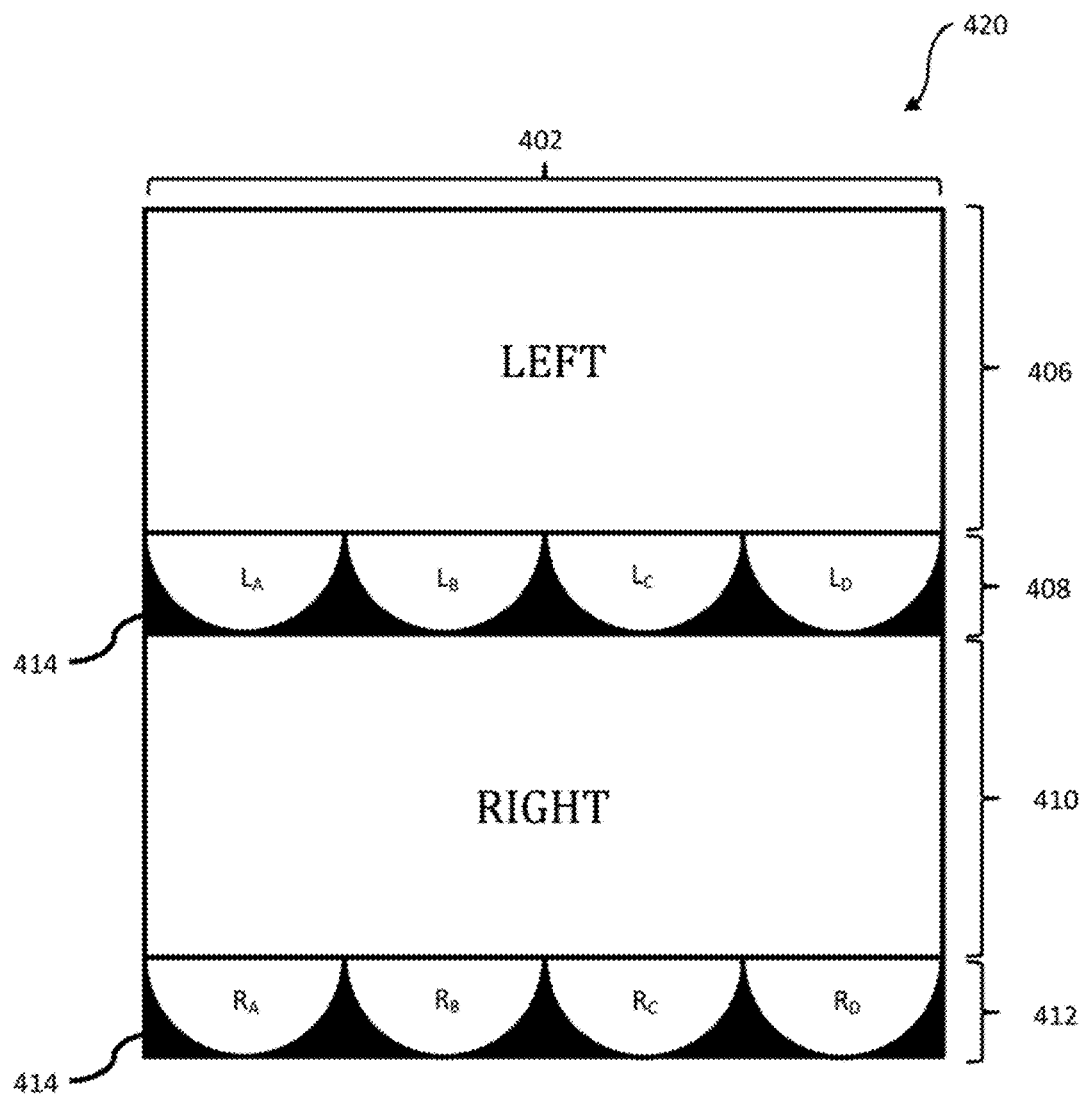
FIG. 4B is a graphical representation of a second exemplary embodiment of a frame packing arrangement for stereo captured images, useful in describing the principles of the present disclosure.

FIG. 4B depicts an alternative frame packing arrangement 420 in which the left and right ERP imaging data also includes left and right top and bottom view imaging data. As illustrated, the frame packing arrangement 420 may possess a frame pixel width 402 with a pixel depth 406 containing, for example, left image ERP imaging data, pixel depth 408 containing left image fish eye projection or ERP projection top and bottom view data, pixel depth 410 containing right image ERP imaging data, and pixel depth 412 containing right fish eye projection or ERP projection top and bottom view data. By stacking the left and right imaging data using, for example, the 8:3 SSP or 8:3 RSP frame packing arrangement of FIG. 3B, the resultant frame packing arrangement 420 of FIG. 4B results in a 4:3 aspect ratio.

A 4:3 aspect ratio for frame packing arrangement 420 is advantageous as this stereo imaging data may be encoded/decoded using extant codecs that are specifically tailored to handle 4:3 aspect ratio images. However, the frame packing arrangement 420 may be sub-optimal for the purposes of, for example, compression efficiency during the encoding process as frame packing arrangement 420 doesn't employ any continuity along the equatorial axis of the ERP projection data (e.g., left and right imaging data), nor along the top and bottom images (e.g., $L_A$, $L_B$, $L_C$, $L_D$, $R_A$, $R_B$, $R_C$, $R_D$). In addition, and similar to the discussion with regards to FIG. 3A, the frame packing arrangement 420 of FIG. 4B also includes depicted dark regions 414.

In some implementations, the depicted dark regions 414 may contain null data, thereby enabling reduced processing overhead for, inter alia, the encoding/decoding of frame packing configuration 420. Additionally, the null data may be enabled for reduced transmission bandwidth and lower bit rates. In alternative implementations, some or all of the depicted dark regions 414 may include metadata information that may, for example, be utilized for the stitching of the captured panoramic for display on a computing device. Additionally, or alternatively, in some implementations, the depicted dark regions 414 may include information that enables a decoder to determine the particular encoding format configuration chosen such as, for example, determining which frame packing configuration 420, 440 (FIG. 4C), 450 (FIG. 4D), 460 (FIG. 4E), 470 (FIG. 4F) has been utilized for the encoding process. In some implementations, the depicted dark regions 414 may include additional information such as that disclosed in co-owned and co-pending U.S. patent application Ser. No. 15/406,175 filed Jan. 13, 2017 entitled "Apparatus and Methods for the Storage of Overlapping Regions of Imaging Data for the Generation of Optimized Stitched Images", incorporated supra. In one or more implementations, a decoder may utilize information contained within the depicted dark regions 414 for the decoding/rendering of the frame, while, for example, legacy decoders may simply discard the data contained within dark regions 414.

Figure 4C:
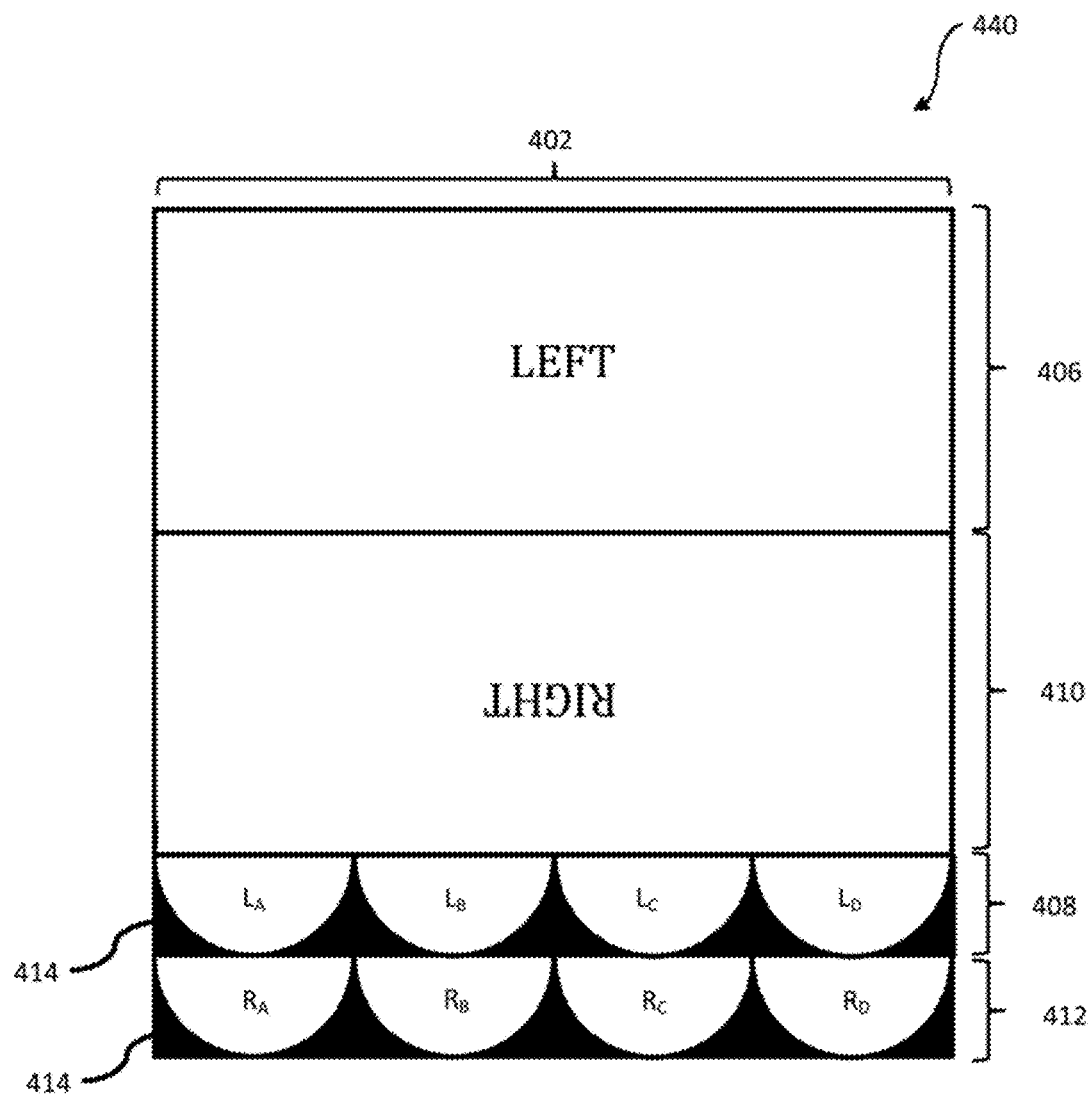
FIG. 4C is a graphical representation of a third exemplary embodiment of a frame packing arrangement for stereo captured images, useful in describing the principles of the present disclosure.

FIG. 4C illustrates one such alternative frame packing arrangement 440 that addresses some of the aforementioned continuity deficiencies of the frame packing arrangement of FIG. 4B. Specifically, frame packing arrangement 440 differs from that shown in FIG. 4B as the right imaging data (e.g., ERP imaging data) within pixel depth 410 has been: (1) inverted; and (2) reversed. By inverting and reversing the right imaging data, better continuity is achieved as a result of the fact that, for example, the equatorial part of the right image data has been placed adjacent to the equatorial part of the left image data. In some implementations, it may be desirable to either invert or reverse one of the left or right imaging data as opposed to inverting and reversing one of the left or right imaging data. This additional continuity may result in improved compression efficiency during the encoding process of this stereo imaging data; however, the encoding of the top images (e.g., $L_A$, $L_B$, $R_A$, $R_B$) and bottom images (e.g., $L_C$, $L_D$, $R_C$, $R_D$) may be sub-optimal for the purposes of improving upon compression efficiency during the encoding process.

Figure 4D:
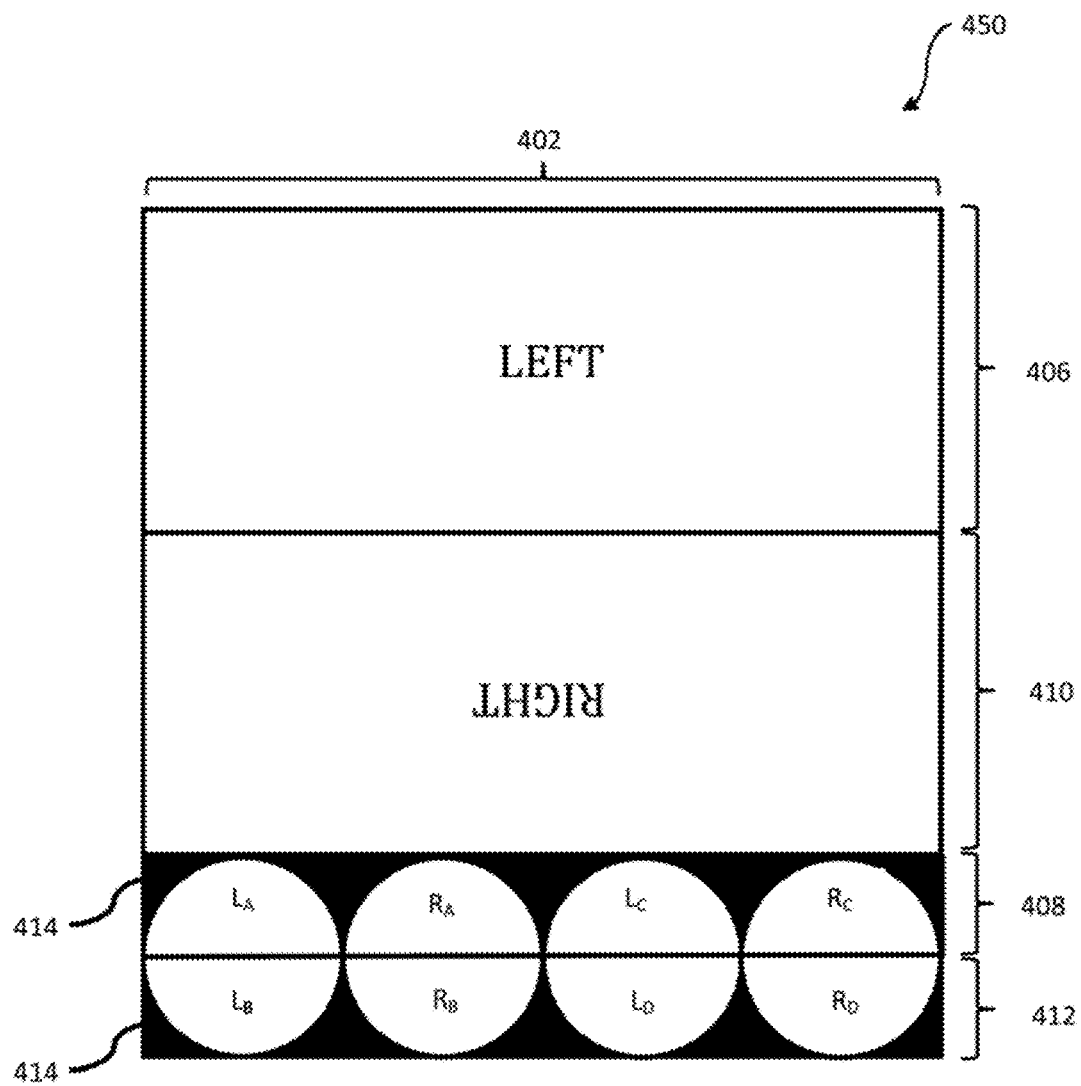
FIG. 4D is a graphical representation of a fourth exemplary embodiment of a frame packing arrangement for stereo captured images, useful in describing the principles of the present disclosure.

FIG. 4D illustrates one such alternative frame packing arrangement 450 that continues to improve upon some of the aforementioned continuity deficiencies of the arrangement of FIG. 4C. Specifically, in frame packing arrangement 450, the top images (e.g., $L_A$, $L_B$, $R_A$, $R_B$) and bottom images (e.g., $L_C$, $L_D$, $R_C$, $R_D$) have been placed in close proximity with respect to one another, improving upon continuity and improving upon the corresponding compression efficiency of encoding these top and bottom images.

Figure 4E:
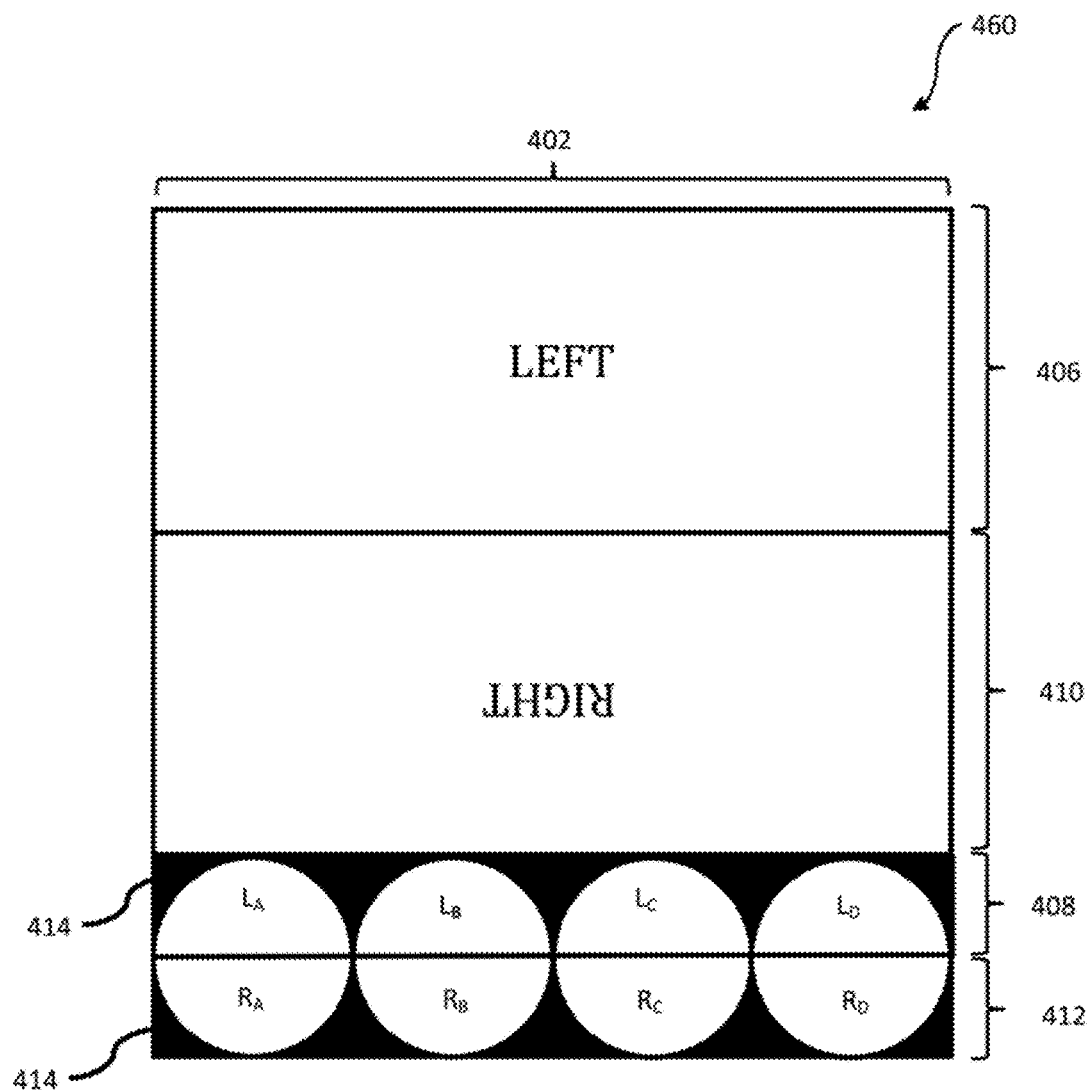
FIG. 4E is a graphical representation of a fifth exemplary embodiment of a frame packing arrangement for stereo captured images, useful in describing the principles of the present disclosure.

FIG. 4E illustrates yet another alternative frame packing arrangement 460 for the packing of stereo imaging data. Specifically, the frame packing arrangement 460 of FIG. 4E is similar to the frame packing arrangement 450 of FIG. 4D; however, the packing of the top and bottom imaging data differs from that illustrated in FIG. 4D. Specifically, for a given left image portion of the top and bottom images (e.g., image portion $L_A$), a corresponding right image portion of the top and bottom image is placed adjacent to the left image portion (e.g., image portion $R_A$ for image portion $L_A$). While the frame packing arrangement 460 of FIG. 4E does not have as good as continuity, and associated improved compression efficiencies with regards to the frame packing arrangement 450 of FIG. 4D, the frame packing arrangement 460 of FIG. 4E does have its advantages.

As a brief aside, stereo image data typically employs improved offset (and associated perception of depth) along a given equatorial plane. As a viewer of the content fixes their gaze away from the given equatorial plane (e.g., looks up, looks down, etc.), the offset between the corresponding left and right images may diminish. In particular, stereo imaging data tends to approach the look of mono imaging data at the poles, while maintaining the perception of depth along the given equatorial plane. In particular, and in some implementations, if stereo imagery was provided at the poles (i.e., away from the given equatorial plane) and the viewer turned their head by, for example, 180°, the left and right eye imagery may become swapped, resulting in, inter alia, nausea and fatigue for the viewer. Additionally, if a viewer of the stereo imagery looked at an off-kilter viewing angle (i.e., where one eye may be focused farther above/below the given equatorial plane than the other eye), this may result in, inter alia, nausea and fatigue as well for the user. In some implementations, this may be the primary reasoning for why extant stereo VR camera rig manufacturers do not even bother collecting stereo imagery at, for example, the top and bottom (i.e., poles) orthogonal with the given equatorial plane. As a result, in some implementations, the respective views of the left/right images tend to have less and less offset (e.g., become near identical) as a viewer fixes his gaze away from the equatorial plane.

Accordingly, the frame packing arrangement 460 of FIG. 4E may lend itself to simply obviating this nearly redundant or redundant data when looking towards the poles of the captured image(s) by simply disregarding the imaging data located in pixel depth 412 (or alternatively, pixel depth 408). For example, a decoder may simply disregard this near redundant data or redundant data when decoding frame packing arrangement 460 of FIG. 4E. In some implementation, an encoder may simply choose not to encode this near redundant data (e.g., discarding this data during the encoding process) in order to effectively gain the frame packing arrangement 470 depicted in FIG. 4F. Hence, here lies one salient advantage for the frame packing arrangements 460, 470 illustrated in FIGS. 4E and 4F. Namely, the ability to use this optional imaging data "on the fly". For example, if there is a need to present full stereo imagery (depth) at the poles (e.g., as a result of having sufficient available bitrate), a signal may be sent to the encoder that is indicative that frame packing arrangement 460 should be utilized. If however, the bitrate requirement drops and/or the application needs to present mono data to a viewer at the poles, it may either encode frame packing arrangement 470 or may simply discard pixel depth 412 (e.g., crop off the bottom part of the image) of frame packing arrangement 460.

Figure 4F:
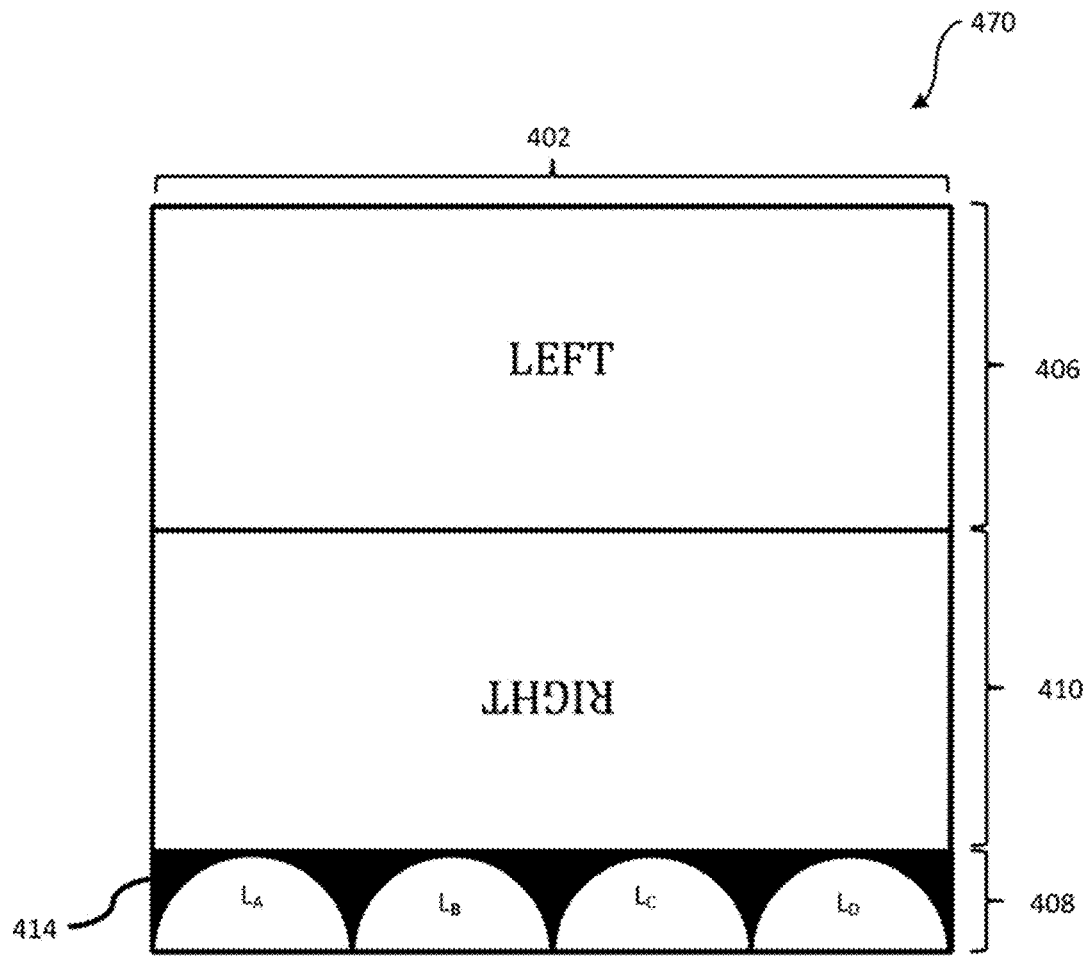
FIG. 4F is a graphical representation of a sixth exemplary embodiment of a frame packing arrangement for stereo captured images, useful in describing the principles of the present disclosure.

FIG. 4F illustrates an exemplary frame packing arrangement 470 that may have a 37.5% lower amount of pixels for a given frame of data than, for example, the frame packing arrangement 400 shown in FIG. 4A. For example, in the exemplary context of 4K resolution imaging data, frame packing arrangement 400 of FIG. 4A may have a pixel width of 4,096 pixels and a pixel depth of 4,096 pixels (e.g., two 4,096×2,048 pixel images per frame). However, frame packing arrangement 470 may have a similar pixel width (e.g., 4,096 pixels), but a significantly reduced pixel depth (e.g., 2,560 pixels) resulting in an 8:5 aspect ratio. Accordingly, by utilizing the frame packing arrangement 470 of FIG. 4F, one may only require, for example, 25% more pixels for 4K stereo imaging data as compared with non-stereo (mono) 4K imaging data, while still providing for stereo image/video data along the given equatorial plane of the image capturing device, which may be a better tradeoff under given bandwidth/complexity and latency constraints.

Additionally, additional compression efficiency using, for example, existing codecs can be increased if a motion search window is large enough to traverse across imaging facets (e.g., $L_A$ and $L_B$ and/or $L_C$ and $L_D$, as but two of many examples). Moreover, codecs may be utilized to motion compensate across the imaging facets (e.g., equatorial (e.g., ERP), top, and bottom) in, for example, three separate encoding loops, thereby improving upon the resultant compression efficiency for the encoding of these stereo images.

Alternative Two Facet Frame Packing Arrangements—

As a brief aside, and generally speaking, in order to obtain better coding efficiency utilizing, for example, existing codecs, it is often desirable to have as few seams (or discontinuities) as possible. Having a lower number of seams may result in a better subjective quality for the image as, for example, the seam surface area gets smaller as compared with the total area on the captured sphere (or captured panoramic image). For example, and referring to the aforementioned 6:1 and 1:6 aspect ratio frame packing arrangements shown in FIGS. 1A-1C as compared with the 8:3 and 3:8 aspect ratio frame packing arrangements shown in FIGS. 3A-3E; the 8:3 and 3:8 will have the advantages as discussed previously herein, while only increasing the level of discontinuity by approximately 3%. Accordingly, it may be desirable to design a projection/frame packing arrangement that achieve many, if not all, the benefits of the 8:3 and 3:8 aspect ratio frame packing arrangements shown in FIGS. 3A-3E, while further reducing the amount of discontinuity associated with the image.

Accordingly, a desired projection/frame packing arrangement may have: (1) a lower number of discontinuities, so that codecs can perform more optimally while reducing the difficulties associated with dealing with seam issues; (2) possessing an arrangement that is closer to a 16:9 aspect ratio such that line buffers get optimally used and providing improved performance for parallel processing tools on existing codecs (e.g., slices in H.264 where square slices tend to work more optimally); and (3) a layout that is more ready to render. For example, and referring to item (3), for the purposes of live streaming video content or for previewing-type applications, it may be desirable not to have to re-project in order to extract a viewport from the panoramic content, but rather to perform, for example, a relatively simple pixel crop from the originally projected video content. In other words, performing a pixel crop may be more advantageous from, for example, a processing overhead/memory resource allocation, etc. point of view as compared with having to perform, for example, a re-projection operation, image stitching operations and the like.

Figure 5A:
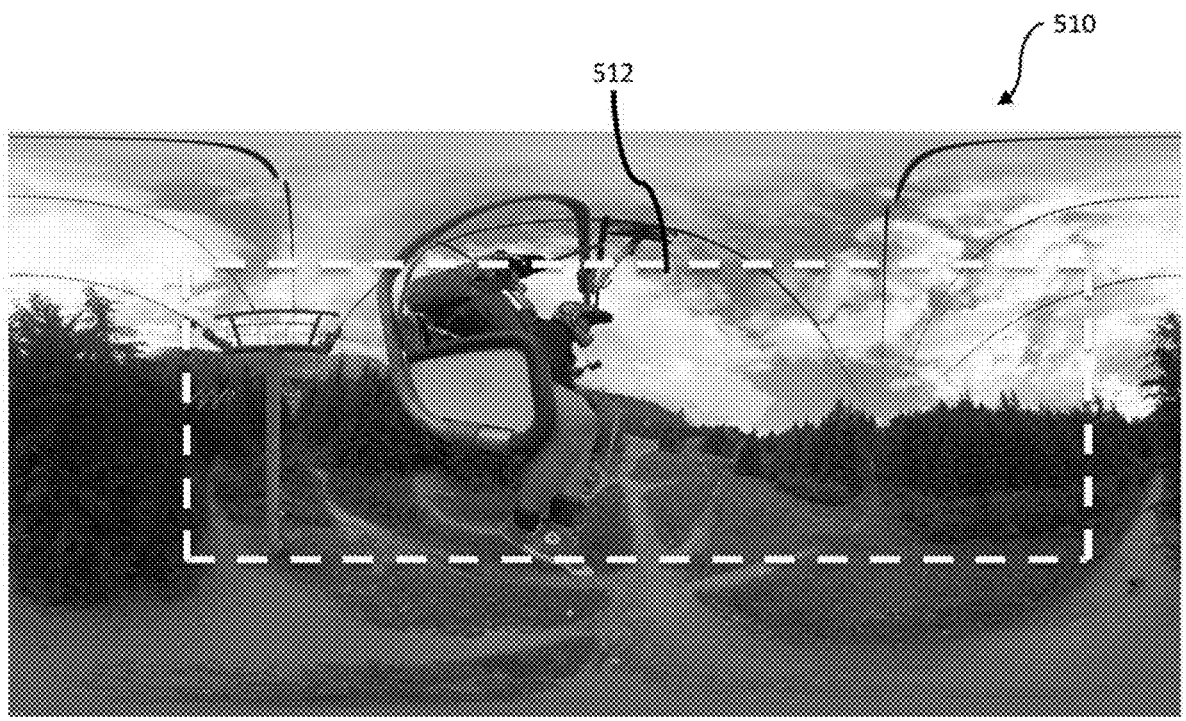
FIG. 5A is a graphical representation of a first cropped region for use with, for example, RSP-3×2 frame packing arrangements, useful in describing the principles of the present disclosure.

Referring now to FIGS. 5A-5J, one such frame packing arrangement is shown that possesses some (or all) of the aforementioned advantages. In the context of RSP, the frame packing arrangement described subsequently herein may be referred to as RSP-3×2 or as RSP-2×3 (e.g., possessing a 3:2 or 2:3 aspect ratio, respectively) as will become more readily apparent from the following discussion. FIG. 5A illustrates a first facet 512 (or row) that may be obtained by, for example, directly cropping, for example, the middle portion from an ERP image 510. For example, the dashed line in FIG. 5A may be indicative of a cropped portion 512 of an ERP image 510 that covers a spherical image having, for example, 270° of angle coverage along the equator and 90° of angle coverage along the meridian (e.g., a 3:1 aspect ratio for this cropped image). As a brief aside, because ERP images can be thought of as having a cylindrical shape, the cropped portion (indicated by the dashed lines) may be thought of as a partial cylinder. As illustrated in FIG. 5A, the cropped image 512 may be thought of as possessing the front, right and left side views of a 360° spherical image.

Figure 5B:
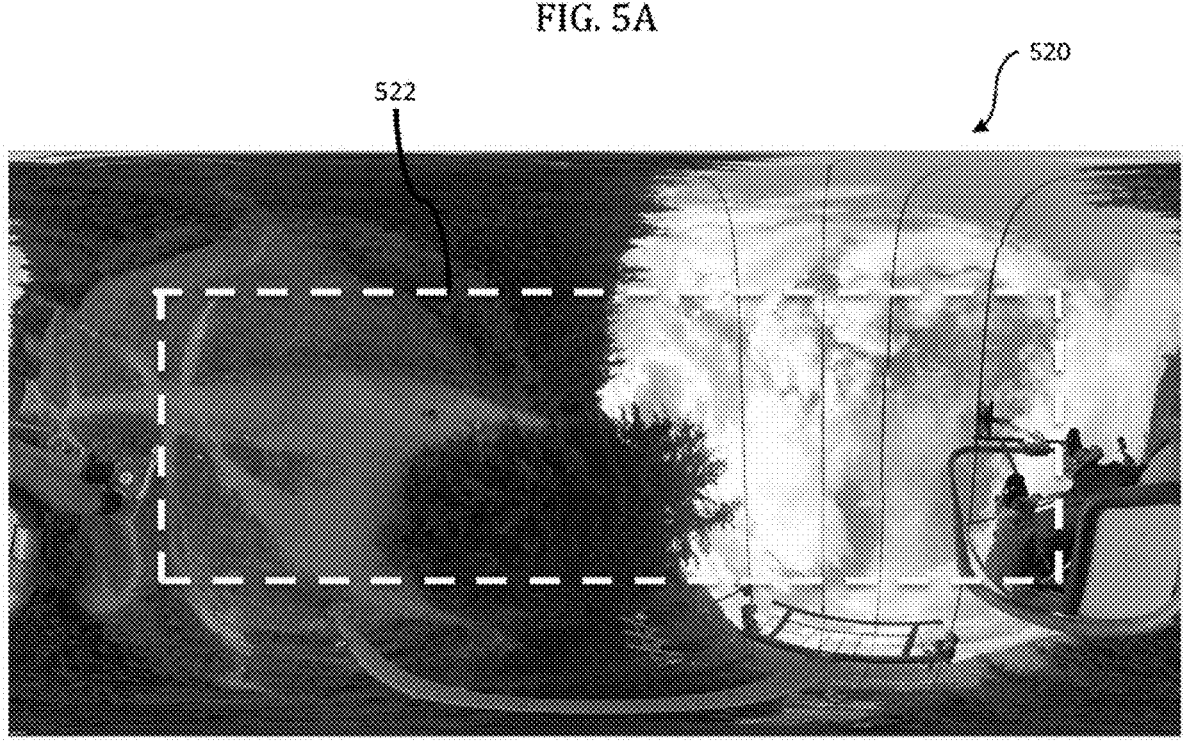
FIG. 5B is a graphical representation of a second cropped region for use with, for example, RSP-3×2 frame packing arrangements, useful in describing the principles of the present disclosure.

Referring now to FIG. 5B, an alternative image of the same panoramic image depicted in FIG. 5A is shown and described in detail. As shown in FIG. 5B, the ERP image has been re-projected such that the pixels at the poles (e.g., top and bottom) have been rotated down to the equator. Additionally, the back side of the image in FIG. 5A has now been brought to the front (i.e., at the center) in the image of FIG. 5B. Similar to that shown with regards to FIG. 5A, the image 520 illustrated in FIG. 5B may be cropped (as indicated by the dashed white line) such that the cropped image 522 in FIG. 5B covers a spherical image having e.g., 270° of angle coverage along the equator and 90° of angle coverage along the meridian (e.g., a 3:1 aspect ratio for this cropped image) for this re-projected image.

Figure 5C:
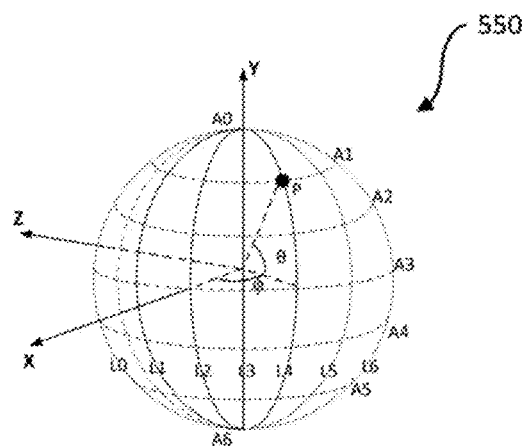
FIG. 5C is a graphical representation of a spherical coordinate system, useful in describing the principles of the present disclosure.

As a brief aside, and referring to FIG. 5C, this operation may be described in terms of three-dimensional geometry 550. The depicted X-axis points toward the front view of the captured spherical image, the depicted Y-axis points toward the top view of the captured spherical image, and the depicted Z-axis points toward the right view of the captured spherical image. Accordingly, when comparing the image depicted in FIG. 5B versus the image depicted in FIG. 5A, it may be seen that the image of FIG. 5B possesses a 180° rotation along the Y-axis (e.g., to bring the back-side of the image to the front-side of the image) and a 90° rotation along the X-axis (e.g., to bring the polar data (top/bottom) to the equator). While the aforementioned example should be considered exemplary, it would be readily appreciated by one of ordinary skill given the contents of the present disclosure that other suitable rotations are also possible.

Figure 5D:
FIG. 5D is a graphical representation of an exemplary RSP-3×2 frame packing arrangement using the first and second cropped regions of FIGS. 4A and 4B, useful in describing the principles of the present disclosure.

Referring now to FIG. 5D, the two cropped images 512, 522 from FIGS. 5A and 5B are combined into a single image 500 (i.e., the top row may be the cropped image of FIG. 5A while the bottom row may be the cropped image of FIG. 5B). It would be readily appreciated by one of ordinary skill given the contents of the present disclosure that other suitable frame packing arrangements may be substituted (e.g., the top row may be the cropped image of FIG. 5B while the bottom row may be the cropped image of FIG. 5A). In one or more implementations, the two images 512, 522 may be obtained from a direct spherical to RSP mathematical calculation as set forth in Appendix I that forms part of the present disclosure. In other words, in some implementations it may not be required to convert the spherical captured imaging data to, for example, an ERP image prior to transforming the image to the RSP imaging data illustrated in FIG. 5D. Rather, the RSP image of FIG. 5D may be generated directly from the captured imaging data using a mapping (e.g., a pixel-to-pixel mapping) of the captured image format to the RSP image format.

Figure 5E:
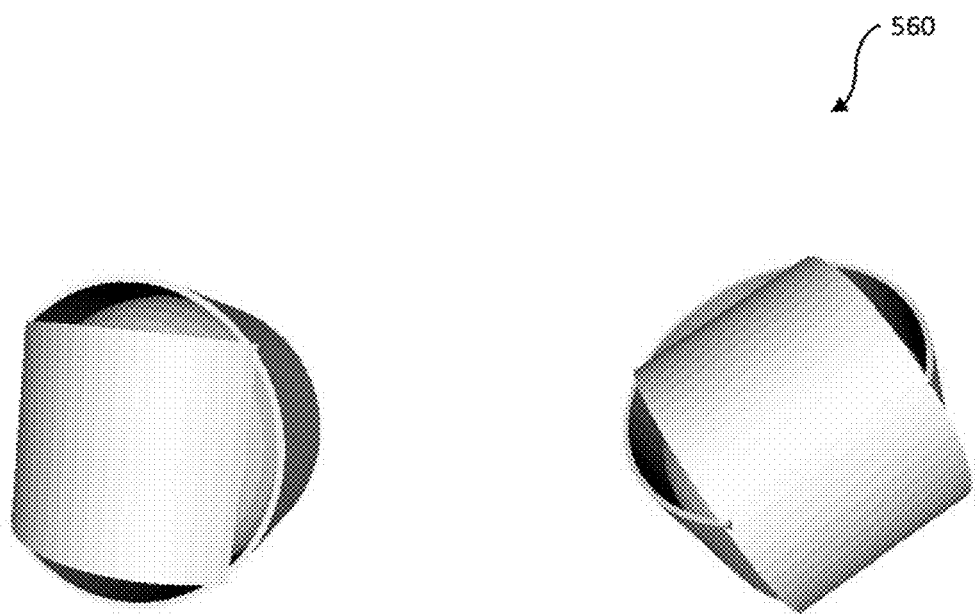
FIG. 5E is a graphical representation of a depiction of the RSP-3×2 frame packing arrangement of, for example, FIG. 4D, useful in describing the principles of the present disclosure.

FIG. 5E is a graphical representation 560 of an exemplary implementation of the depicted images of FIG. 5D oriented in their as-viewed state. In other words, the arrangement depicted in FIG. 5E can be thought of as possessing a similar geometry as the stitched portion of a baseball. For example, a full (or nearly full) 360° image may be represented using the frame packing arrangement depicted in, for example, FIG. 5D. Additionally, the number of discontinuities associated with the image depicted in FIG. 5D as compared with the number of discontinuities depicted in, for example, FIG. 1C has been reduced by approximately 19% thereby achieving the goal of reducing the number of seams (discontinuities) associated with the frame packing arrangement of FIG. 5D and hence may give better coding performance than the alternative arrangement of FIGS. 1A, 1B, and 1C.

The RSP-3×2 arrangement may allow for a reduction of pixels by 25% as compared with a 360° video representation in an ERP format. For example, a 4K (4,096 pixels by 2,048 pixels) ERP coded image may only take 3,072 pixels×2,048 pixels in the RSP-3×2 arrangement. The lower number of pixels needed to represent the video data may result in improved compression efficiency, improved battery life, lower playback latency and/or lower memory footprint needs.

Figure 5F:
FIG. 5F is a graphical representation of one exemplary RSP-2×3 frame packing arrangement using the first and second cropped regions of FIGS. 4A and 4B, useful in describing the principles of the present disclosure.
Figure 5G:
FIG. 5G is a graphical representation of another exemplary RSP-2×3 frame packing arrangement using the first and second cropped regions of FIGS. 4A and 4B, useful in describing the principles of the present disclosure.

Additionally, the RSP-3×2 arrangement of FIG. 5D may get closer to a 16:9 aspect ratio as compared with the 6:1, 1:6, 8:3, and 3:8 frame packing arrangements previously depicted. Accordingly, line buffers may be utilized more efficiently. Moreover, the RSP-3×2 arrangement of FIG. 5D can signal 25% more resolution (or a reduction in transmission bandwidth) as compared with a 360° ERP image, while still maintaining compatibility with, for example, existing codecs. For example, the RSP-3×2 arrangement of FIG. 5D may enable a resolution of 3,744 pixels by 2,496 pixels which would be compatible with Level 5.1 and Level 5.2 constraints for H.264/AVC. In addition, the aforementioned 3,744 pixels by 2,496 pixels may be readily decodable by already deployed hardware decoders. For example, the hardware decoders in many extant smartphones can decode 3,744 pixels×2,496 pixel resolutions because the aspect ratio gets closer to 16:9 with the width being less than 3,840 pixels (e.g., most smartphones are designed to decode and encode 4K 16:9 video (3,840 pixels×2,160 pixels)). FIG. 5F and FIG. 5G depict alternative arrangements 570, 580 where the frame packing arrangement of FIG. 5D is rotated by 90° and 270°, respectively.

Figure 5H:
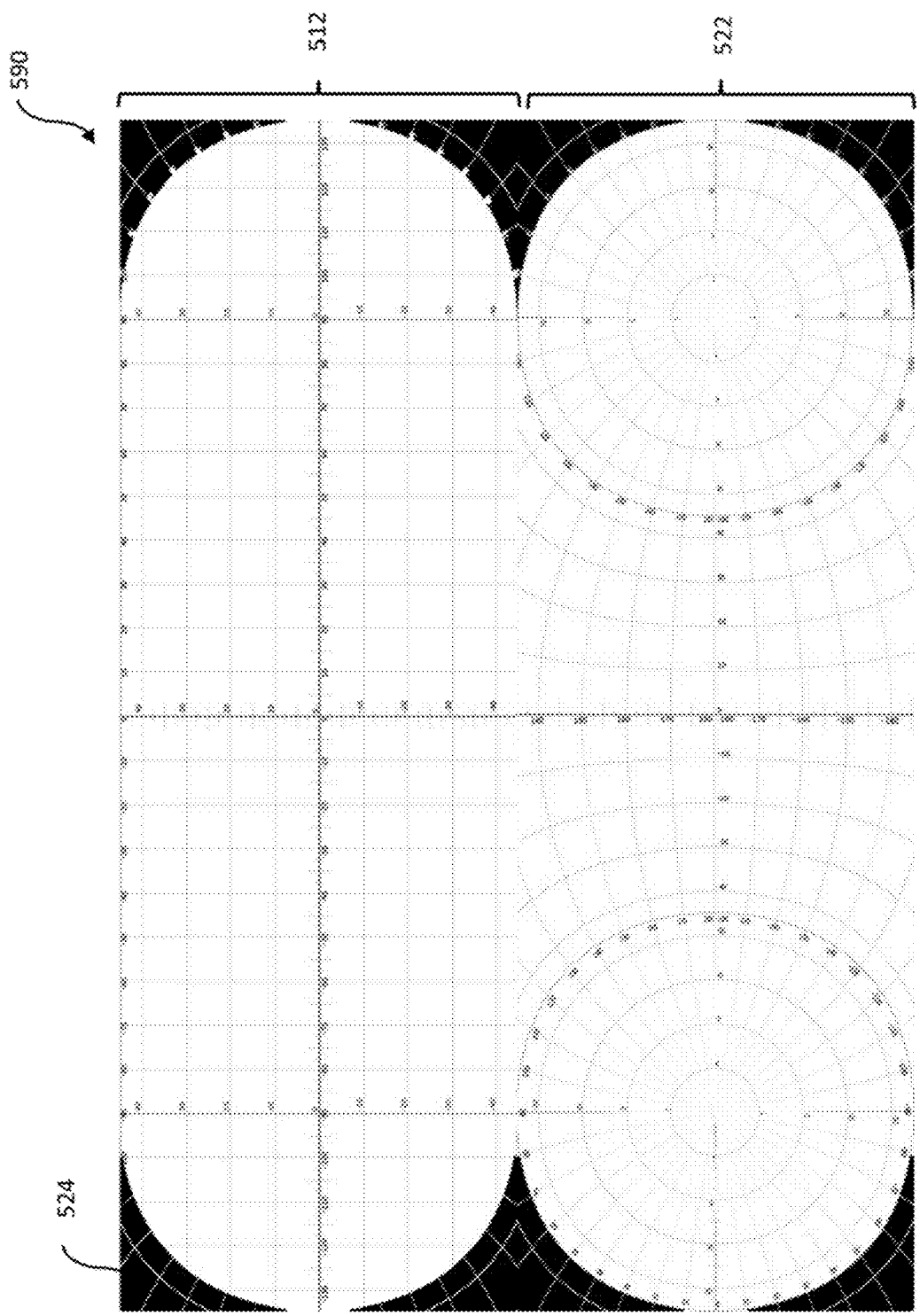
FIG. 5H is a graphical representation of one exemplary RSP 3×2 frame packing arrangement illustrating redundant imaging data being blacked out from the frame, useful in describing the principles of the present disclosure.
Figure 51:
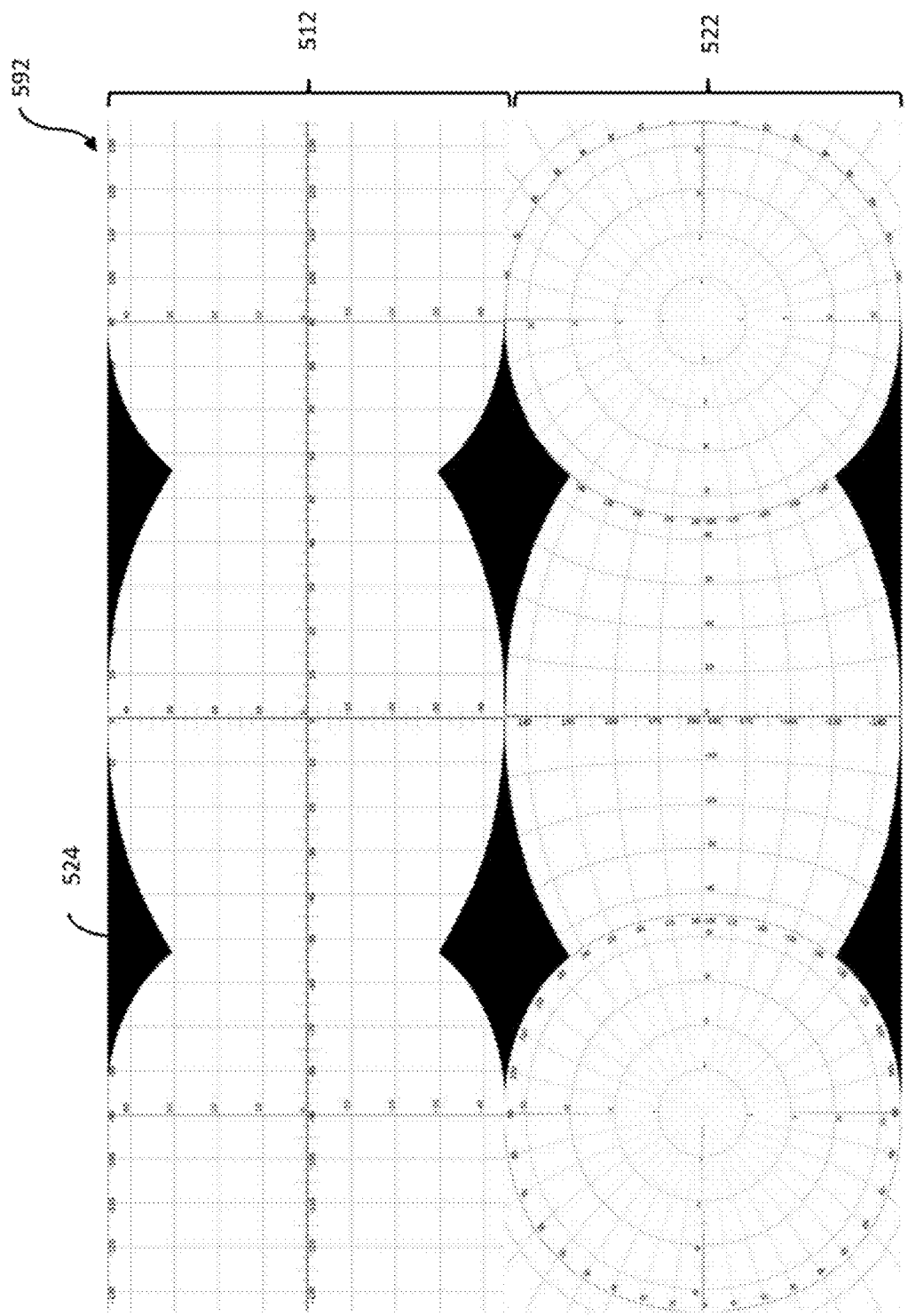

As a brief aside, and referring again to FIG. 5D, it may be seen that redundant imaging data is contained within the top facet 512 and the bottom facet 522. For example, the person on the ski lifts right elbow is shown in both the bottom right portion of the bottom facet 522 as well as the upper left portion of top facet 512. Accordingly, in some implementations it may be desirable to "black out" portions of the RSP-3×2 (or RSP-2×3) image, thereby resulting in fewer bits for the frame of imaging data thereby resulting in improved compression efficiency during the encoding process as well as faster encoding/decoding of the image. FIG. 5H illustrates one such exemplary implementation for the blacking out of redundant imaging information for a frame 590 of imaging data. As shown, various portions 524 of the image have been blacked out. Specifically, in the frame 590 of imaging data illustrated in FIG. 5H, the corners of both top facet 512 and bottom facet 522 have been blacked out which is indicative of redundant information.

Referring now to FIG. 5I, another exemplary implementation for the blacking out of redundant imaging information for a frame 592 of imaging data is illustrated. Similar to that shown with regards to FIG. 5H, various portion 524 of the image have been blacked out. However, unlike the embodiment illustrated in FIG. 5H, the position of these blacked out portions 524 of the image do not reside at the corners of the top 512 and bottom 522 facets. Rather, these blacked out portions 524 reside between approximately 180° as indicated in the top facet 512 (i.e., between −90° and +90°) and on the top and bottom of each of the top 512 and bottom 522 facets. In some implementations, the approach shown in FIG. 5H may be preferred, as this particular configuration simplifies the drawing of the black arc while moving all black regions to the sides. In some implementations, the approach shown in FIG. 5I may be preferred since it creates a natural black separation between the top and bottom facets, thereby mitigating artifacts that may arise as a result of inter-facet filtering or motion compensation during compression, pre-processing or post-processing.

Figure 5J:
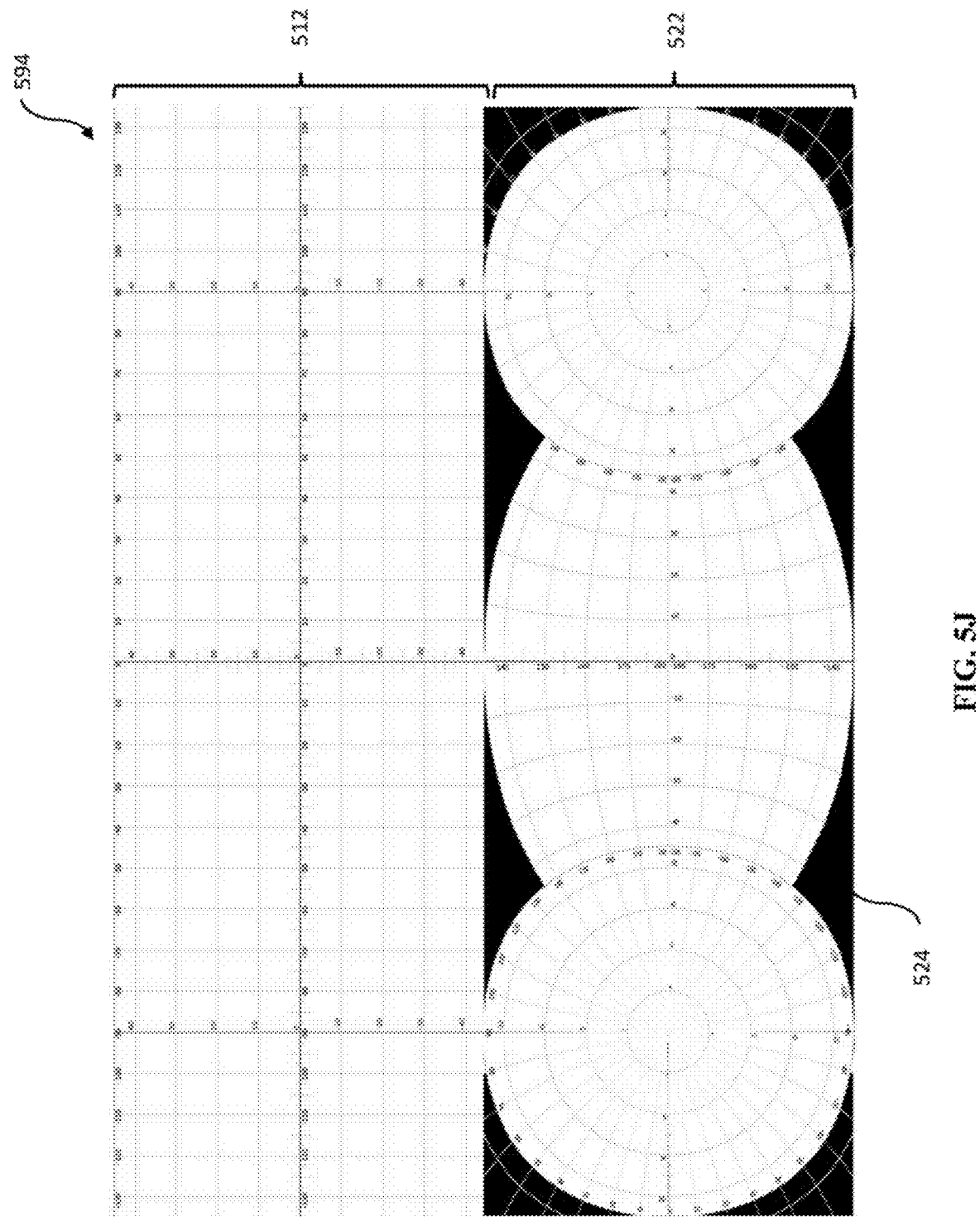
FIG. 5J is a graphical representation of yet another exemplary RSP 3×2 frame packing arrangement illustrating redundant imaging data being blacked out from the frame, useful in describing the principles of the present disclosure.

Referring now to FIG. 5J, yet another exemplary implementation for the blacking out of redundant imaging information for a frame 594 of imaging data is illustrated. Unlike the embodiments illustrated in FIGS. 5H and 5I, the top facet 512 does not include any blacked out imaging information; however, the bottom facet 522 includes a larger blacked out portion 524 than either of the frames 590, 592 of information illustrated in FIGS. 5H and 5I. Specifically, the bottom facet 522 has blacked out portions that correspond generally to the blacked out portions in FIG. 5H and the blacked out portions that correspond generally to the blacked out portion in FIG. 5I. Such an implementation may have advantages where, for example, it may be advantageous to preserve all of the imaging information contained within the top facet 512 (e.g., the top facet 512 may contain imaging information that is more frequently associated with common viewport positions when viewing this panoramic content), while the bottom facet 522 may have a fewer number of bits (e.g., information) thereby resulting in faster encoding/decoding of the information contained within the bottom facet 522 of imaging data and/or improved compression efficiencies as compared with, for example, the top facet 512 imaging information. Additionally, the top facet 512 may include, for example, the blacked out portions that correspond generally to the blacked out portions in FIG. 5H and the blacked out portions that correspond generally to the blacked out portion in FIG. 5I, while the bottom facet 522 does not include any blacked out portions in some implementations. These, and other implementations, would be readily apparent to one of ordinary skill given the contents of the present disclosure.

Additionally, any adjacent pixel resolution that may be available in these blacked out portions may be used for the aforementioned metadata information that may, for example, be utilized for the stitching of the captured panoramic for display on a computing device. Additionally, or alternatively, in some implementations, these regions may include information that enables a decoder to determine the particular encoding format configuration chosen such as, for example, determining which frame packing configuration of FIG. 5D, FIG. 5F, FIG. 5G, etc. has been utilized for the encoding process. In some implementations, the dark region (blacked out regions) may include additional information such as that disclosed in co-owned and co-pending U.S. patent application Ser. No. 15/406,175 filed Jan. 13, 2017 entitled "Apparatus and Methods for the Storage of Overlapping Regions of Imaging Data for the Generation of Optimized Stitched Images", incorporated supra. In one or more implementations, a decoder may utilize information contained within the dark regions (blacked out regions) for the decoding/rendering of the frame, while legacy decoders, for example, may simply discard any of the additional data contained within these dark regions.

While the RSP embodiments described with reference to FIGS. 5A-5J have been primarily described in the context of using ERP imaging data, it will be appreciated that the term RSP more broadly encompasses any projection that uses some portions of the image from an original non-rotated image (using any projection), while using other portions of the original non-rotated image after applying a spherical rotation and re-projection onto the original or any other projection as discussed supra. Accordingly, in some implementations it may be desirable to use a so-called equal area adjustment to an equirectangular projection (ERP), or a native equal area projection (EAP) when encoding an RSP image (e.g., an RSP-3×2 arrangement or RSP-2×3 arrangement).

As a brief aside, although ERP has the advantage of being both straightforward and intuitive when displaying ERP imaging data (in the RSP format) on many common display devices, in some implementations using ERP imaging data (in the RSP format) may prove sub-optimal for video transmission in terms of bandwidth, image compression, bit rate considerations and/or imaging quality. Specifically, ERP maps spherical coordinates to a latitude and longitude grid with equal spacings. Thus, the top and bottom facets (or portions) of an ERP have a disproportionate number of pixels for encoding/compressing the image as a function of the latitude deviation from the equator. In other words, the geometric distortions introduced by ERP allocate more bits to represent image data that is farther from the equator. These areas also contain the most distorted pixel information for the ERP image data; consequently, video compression and encoding quality metrics at such locations take more bandwidth to represent worse image quality.

Figure 5K:
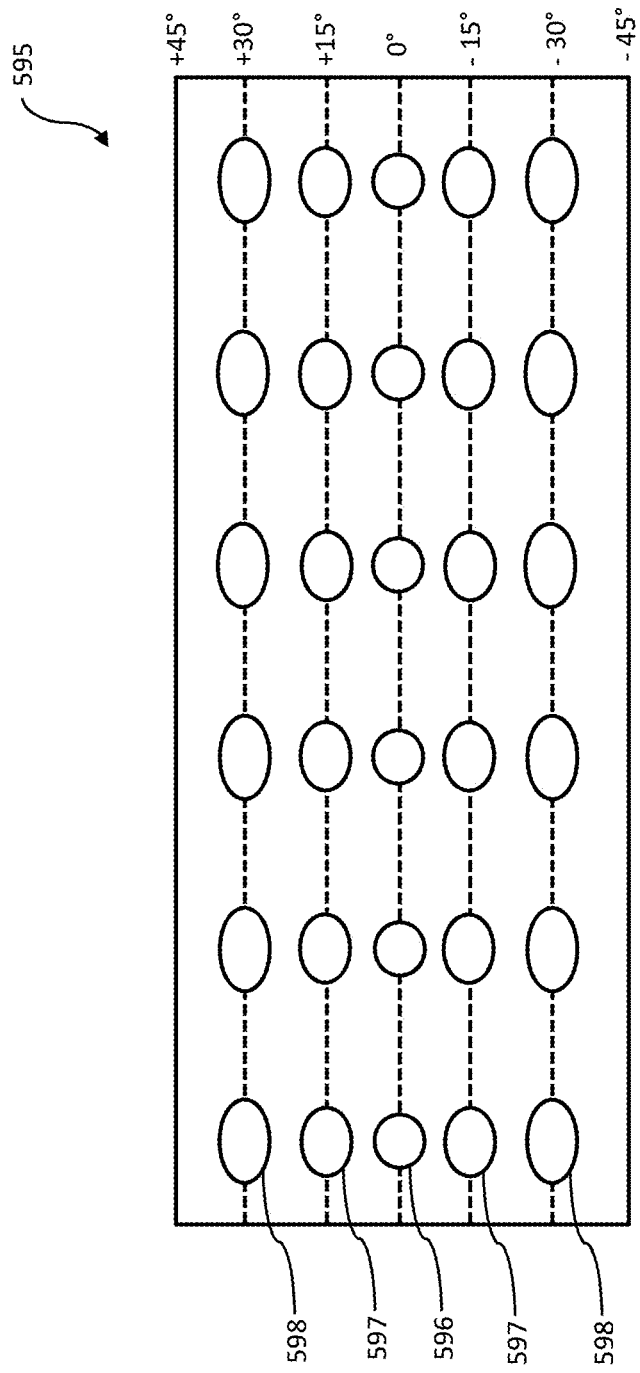
FIG. 5K is a graphical representation of an exemplary frame packing arrangement comprising equirectangular projection (ERP), useful in describing the principles of the present disclosure.

Referring now to FIG. 5K, one such exemplary illustration of an ERP is shown and described in detail. In the illustrated frame 595 of ERP imaging data, the various circles/ellipses 596, 597, 598 are representative of the number of pixels required as a function of latitude in an ERP image (and are depicted for purposes of illustrating the effects of ERP distortion and aren't necessarily drawn to scale). For example, areas resident on the equator (e.g., a latitude of 0°) are represented by small circles 596. At greater latitudinal deviations from the equator, the number of pixels required for the encoding of the same sized circle increases. For example, at a latitude of +15°, the area of ellipse 597 is larger than the small circle 596, thereby requiring an increase in the number of pixels required for encoding at this latitude. Similarly, at a latitude of −15°, the area of ellipse 597 is also larger than the small circle 596, thereby requiring an increase in the number of pixels required for encoding. At a latitude of +30°, the area of ellipse 598 is even larger than both the area of ellipse 597 and the small circle 596, thereby requiring an even larger number of pixels for encoding. At a latitude of greater than 45° (not shown), the area of the ellipse may be even greater (more pronounced) than that depicted by, for example, ellipse 598, thereby requiring additional pixels for encoding.

In contrast, equal area projection (EAP) maps spherical coordinates to a latitude with equal spacings, but a longitude with spacings that decrease at the poles corresponding to the curvature of the sphere. In other words, EAP image information at the higher latitudes are stretched latitudinally and/or shrunk longitudinally by a commensurate amount, such that the bits used to represent an area of the image are substantially equivalent between the equal area and spherical projections. EAP may have better video compression and encoding quality metrics when compared to ERP in some implementations, however EAP typically appears more distorted to human perception in, for example, wider fields of view. For example, in implementations in which a wider field of view is encoded (e.g., 360°×180° (i.e., +/−90°)), ERP may commonly have better video compression and encoding quality metrics than EAP. However, in implementations such as the implementation depicted in FIG. 5K (i.e., +/−45°), the introduced distortion may be significantly less pronounced than a wider field of view format and hence an EAP may have better video compression and encoding quality metrics than ERP. Accordingly, depending upon the implementation chosen, it may or may not be desirable to implement an equal area adjustment to, for example, an ERP portion of an RSP imaging format.

Figure 5L:
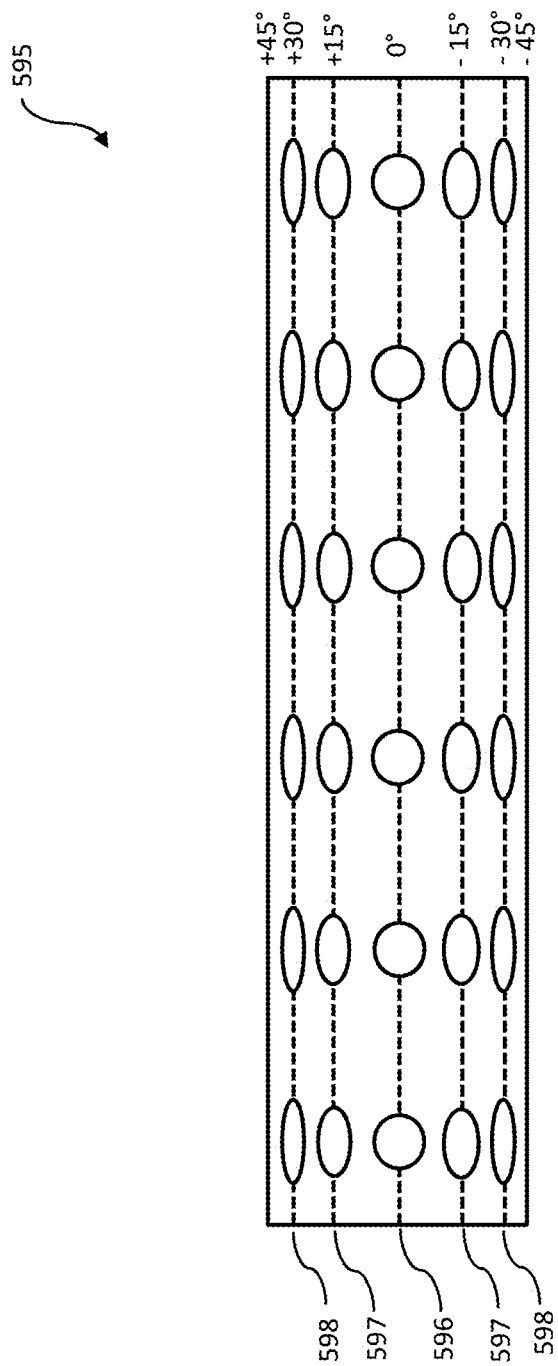
FIG. 5L is a graphical representation of an exemplary frame packing arrangement comprising equal area projection (EAP), useful in describing the principles of the present disclosure.

Referring now to FIG. 5L, the image of FIG. 5K is represented in an EAP mapping. In the illustrated frame of EAP imaging data 595, the various circles/ellipses 596, 597, 598 are representative of the number of pixels required as a function of latitude in an EAP image. At greater latitudinal deviations from the equator, the number of pixels required for the encoding of the same sized circle stays constant because the ellipse is stretched latitudinally and shrunk by a commensurate amount longitudinally.

While EAP preserves image bandwidth (i.e., the information energy associated with each image pixel) across the entire image proportionately, artisans of ordinary skill in the related arts will readily appreciate that still other projections may further adjust the number of bits at different latitudes to achieve desirable effects. For example, a band of latitudes at the center of the projection may be presented according to ERP, whereas bands at larger latitudes progressively shift to EAP. In one such implementation, it may be desirable to adjust the heights (and/or widths) of ellipses 597, such that the height of these ellipses 597 is the same as the height of small circle 596 (thereby preserving the human perception advantages of ERP). However, it may be desirable to adjust the heights (and/or widths) of the ellipses 598 such that the respective areas of these adjusted ellipses 598 is the same as that of ellipses 596 (thereby improving compression). Accordingly, applying an equal area adjustment to an ERP image in its whole or a portion thereof, can be used to e.g.,: (i) improve compression efficiencies associated with the encoding process, (ii) reduce the bandwidth/bit-rate required for imaging data transmission, and/or (iii) improve the imaging quality associated with the imaging data. These and other implementations would be readily apparent to one of ordinary skill given the contents of the present disclosure.

Figure 6A:
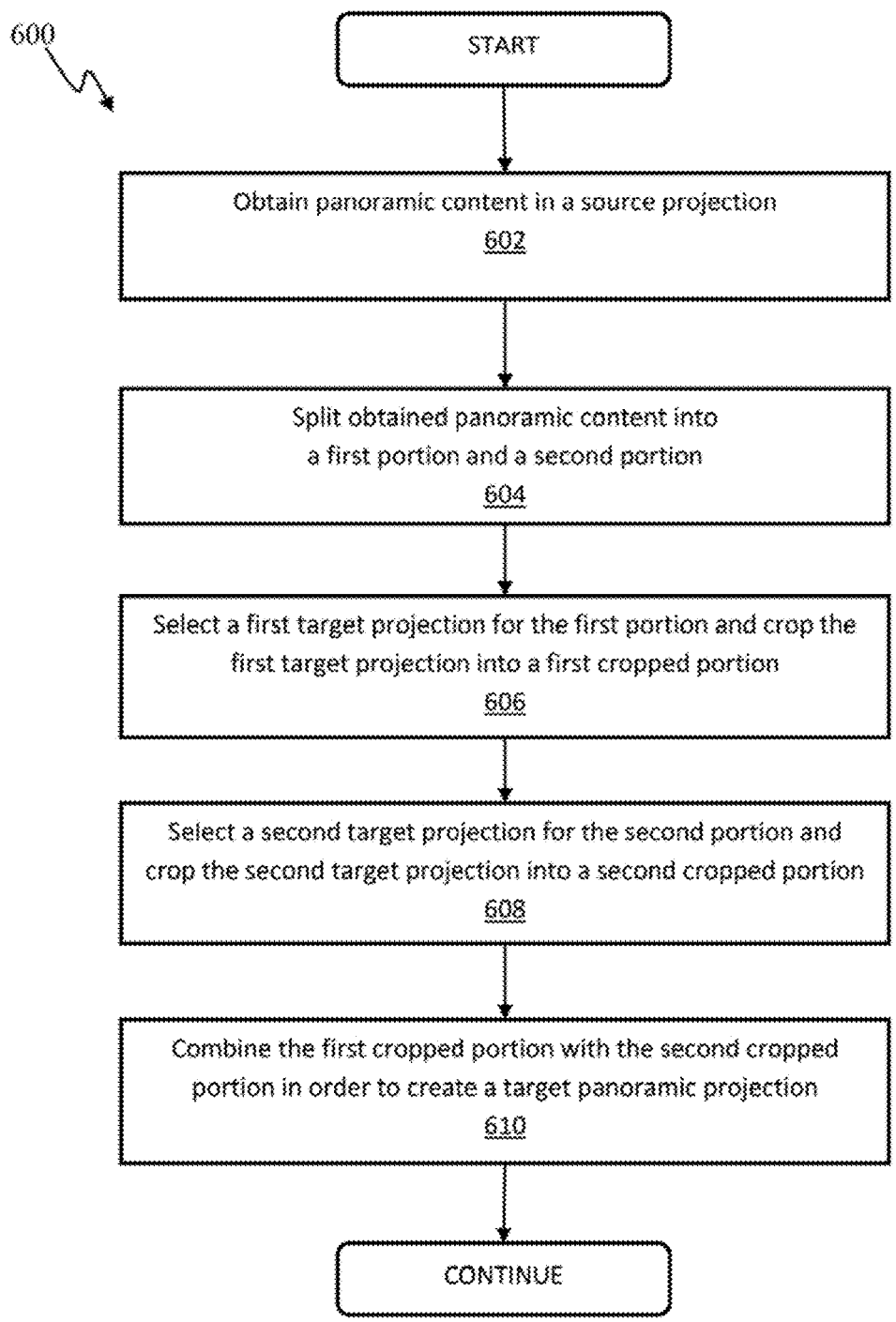
FIG. 6A is a logical flow diagram illustrating an exemplary embodiment for creating a target panoramic projection, useful in describing the principles of the present disclosure.

Referring now to FIG. 6A, one exemplary methodology 600 for the creation of a target panoramic projection (e.g., an RSP-3×2 arrangement or RSP-2×3 arrangement) is shown and described in detail. At step 602, panoramic content is obtained in a source projection. In one or more implementations, the source projection may include the imaging data captured from an image capture device in its source spherical projection.

At step 604, the obtained panoramic content is split into a first portion and a second portion. In some implementations, the first portion may consist of the front, right and left portions of the original panoramic content, while the second portion may consist of the back, top and bottom portions of the original content. In other implementations, the first portion may consist of the front, back and right portions of the original panoramic content, while the second portion may consist of the top, left and bottom portions of the original panoramic content. In yet other implementations, other portions of the original panoramic content may be arbitrarily selected so long as there is continuity within each of the selected portions. In other words, these selected portions may be representative of any continuous portion of the obtained panoramic content. These and other implementations would be readily apparent to one of ordinary skill given the contents of the present disclosure.

At step 606, a first target projection is selected for the first portion and a portion of the image is cropped from the first target projection in order to create a first cropped portion. In some implementations, the first target projection may be an ERP projection and the first cropped portion may be representative of, for example, 270° of coverage along the equator and 90° of coverage along the meridian. In other implementations, the representative coverage may include other angular coverages (e.g., 260°, 280° or other selected degree of coverage along an arbitrarily selected equator and 80°, 100° or other selected degree of coverage along an axis that is orthogonal to the arbitrarily selected equator). In some implementations, step 606 may provide a direct spherical to RSP mathematical calculation (e.g., cropping may be unnecessary) as set forth in, for example, Appendix I. These and other implementations would be readily apparent to one of ordinary skill given the contents of the present disclosure.

At step 608, a second target projection is selected for the second portion and a portion of the image is cropped from the second target projection in order to create a second cropped portion. In some implementations, the second target projection may be a portion of an RSP projection (e.g., the back face is brought to the face and the poles are rotated to the equator) and the second cropped portion may be representative of, for example, 270° of coverage along the equator and 90° of coverage along the meridian. In other implementations, the representative coverage may include other angular coverages (e.g., 260°, 280° or other selected degree of coverage along an arbitrarily selected equator and 80°, 100° or other selected degree of coverage along an axis that is orthogonal to the arbitrarily selected equator). In some implementations, step 608 may provide a direct spherical to RSP mathematical calculation (e.g., cropping may be unnecessary) as set forth in, for example, Appendix I. These and other implementations would be readily apparent to one of ordinary skill given the contents of the present disclosure.

At step 610, the first cropped portion is combined with the second cropped portion in order to create a target panoramic projection. In some implementations, the target panoramic projection may include an RSP projection as discussed previously herein with regards to, for example, FIG. 5D. The combined portions may be oriented geometrically as discussed with regards to FIG. 5D, may be oriented geometrically as discussed with regards to FIG. 5F, or may be oriented geometrically as discussed with regards to FIG. 5G. In some implementations, the target panoramic projection may include a non-RSP projection consisting of two image facets. For example, one facet may consist of an ERP projection that covers a first hemisphere of a spherical coordinate system (that ignores the poles), while the second facet may consist of an ERP projection that covers the other hemisphere of a spherical coordinate system (that ignores the poles). These and other implementations would be readily apparent to one of ordinary skill given the contents of the present disclosure.

Figure 6B:
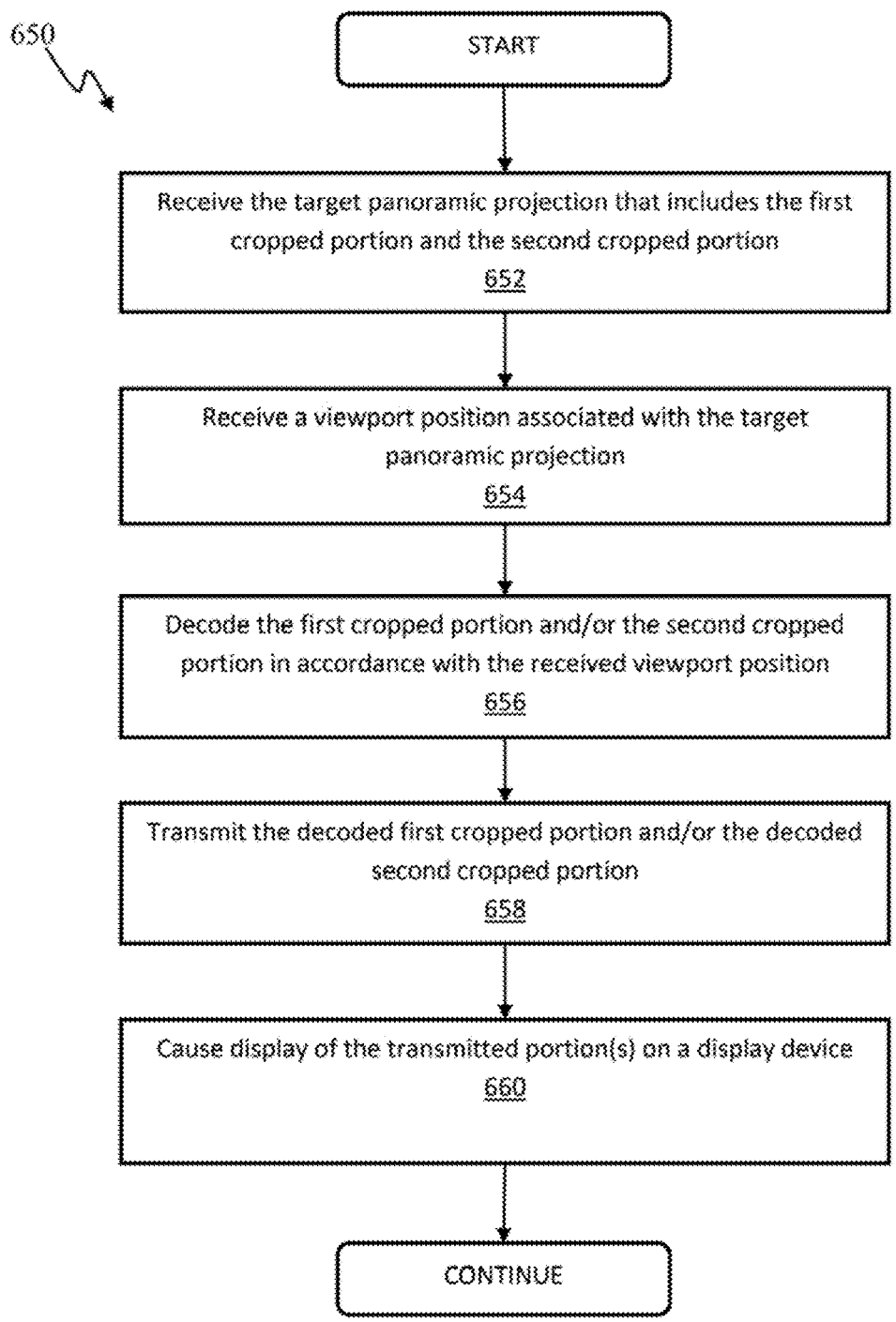
FIG. 6B is a logical flow diagram illustrating an exemplary embodiment for decoding and displaying a target panoramic projection, useful in describing the principles of the present disclosure.

Referring now to FIG. 6B, one exemplary methodology 650 for the decoding and display of a target panoramic projection (e.g., an RSP-3×2 arrangement or RSP-2×3 arrangement) is shown and described in detail. At step 652, the target panoramic projection created at, for example, step 610 may be received. In some implementations, the received target panoramic projection may include a first cropped portion and a second cropped portion.

At step 654, a viewport position of interest associated with the target panoramic projection is received. In one or more implementations, the received viewport position may be oriented entirely within the first cropped portion, may be oriented entirely within the second cropped portion, or may be oriented such that the imaging information for the first and second cropped portions are both needed for the received viewport position.

At step 656, the first cropped portion and/or the second cropped portion are decoded in accordance with the received viewport position, while the remainder of the frame of imaging data may, for example, simply be discarded. Such an implementation may be desirable as the processing resources associated with the decoding process may be reduced as compared with a decoding process in which the entirety of the received target panoramic projection. In some implementations, the entirety of the received target panoramic projection may be decoded using, for example, a portion of the encoding/decoding apparatus illustrated in FIG. 7 and described subsequently herein, without taking into consideration the received viewport position.

At step 658, the decoded target panoramic projection (or decoded portions thereof) are transmitted to a display device and the transmitted portion(s) are displayed on a display device at step 660. In implementations in which the first cropped portion and/or the second cropped portion are decoded in accordance with the received viewport position, only the decoded portion of the received target panoramic projection may be transmitted at step 658, thereby reducing the amount of bandwidth required for the transmission. In implementations in which the entirety of the received target panoramic projection is decoded, the entirety of the decoded target panoramic projection may be transmitted at step 658 and displayed at step 660. In some implementations, the display device may include a VR display, such as that described above with reference to, for example, FIG. 2. In other implementations, the display device may include a display for a smart phone, a monitor of a computing device or television, and/or other types of display devices.

Encoding/Decoding Apparatus for Two Facet Frame Packing Arrangements—

Figure 7:
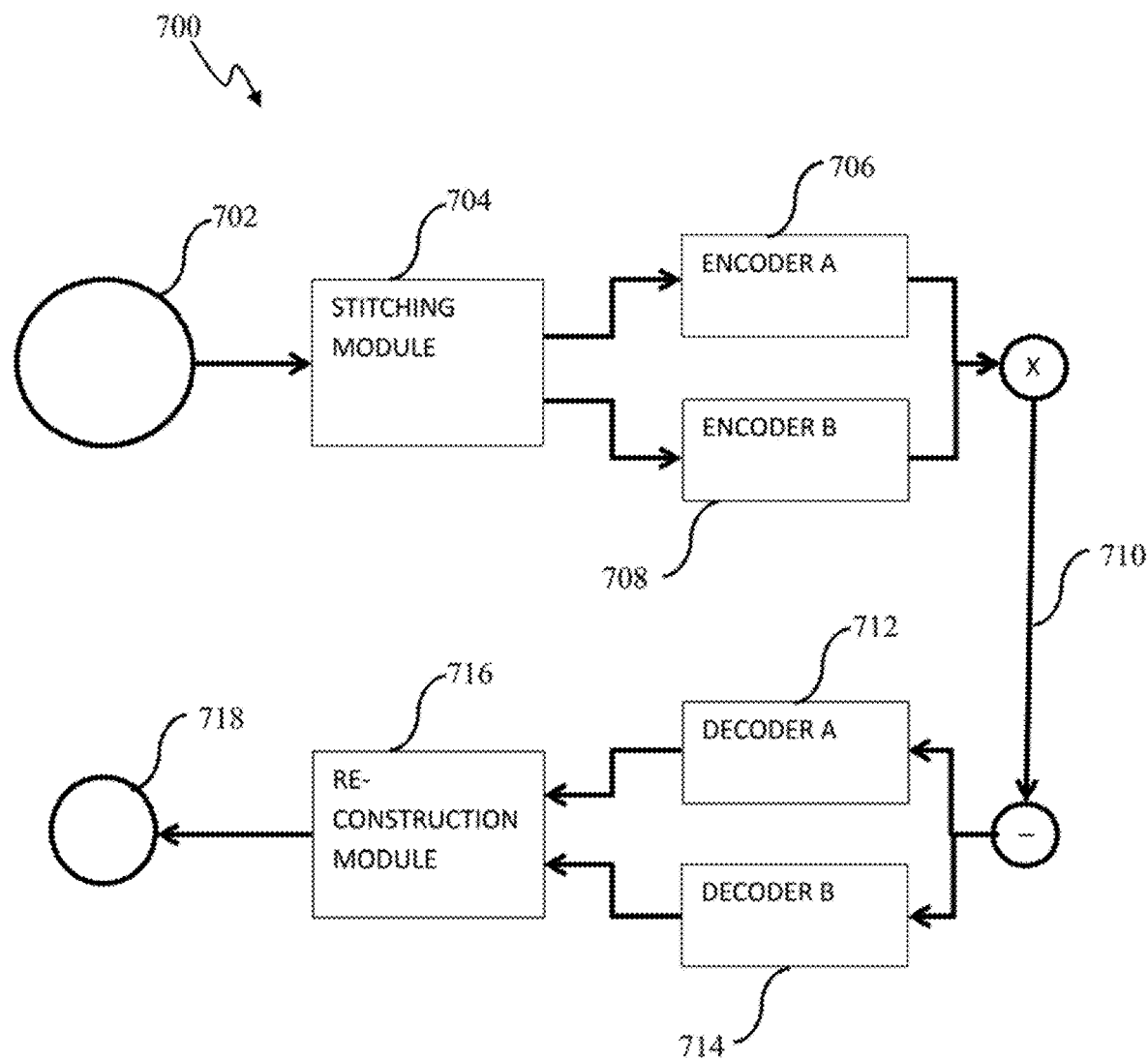
FIG. 7 is a block diagram illustrating an exemplary system for the encoding and decoding of a target panoramic projection, useful in describing the principles of the present disclosure.

Referring now to FIG. 7, an exemplary encoding/decoding apparatus 700 for two facet frame packing arrangements (e.g., an RSP-3×2 frame packing arrangement, an RSP-2×3 frame packing arrangement and the like) is shown and described in detail. The encoding/decoding apparatus includes an image capture device 702; a stitching module 704; two encoders 706, 708; a transmission line 710; two decoders 712, 714; a reconstruction module 716; and a display device 718. While illustrated as a unitary system 700, it is appreciated that individual portions of the encoding/decoding apparatus 700 may be implemented in separate hardware modules. For example, the image capture device 702 may constitute a unitary component; the stitching module 704 and encoders 706, 708 may constitute a unitary component; the transmission line 710 may constitute a unitary component; the decoders 712, 714 and reconstruction module 716 may constitute a unitary component; and the display device 718 may constitute a unitary component. These, and other implementations, would be readily apparent to one of ordinary skill given the contents of the present disclosure.

The image capture device 702 may be configured to capture panoramic content. In some implementations, the image capture device 702 may include two camera components (including a lens and imaging sensors) that are disposed in a Janus configuration, i.e., back to back such as that described in U.S. patent application Ser. No. 29/548,661, entitled "MULTI-LENS CAMERA" filed on Dec. 15, 2015, the foregoing being incorporated herein by reference in its entirety. In one or more implementations, the image capture device 702 may include a six-axis camera device such as that described in U.S. patent application Ser. No. 15/432,700 filed Feb. 14, 2017 and entitled "Apparatus and Methods for Image Encoding using Spatially Weighted Encoding Quality Parameters", the contents of which are incorporated herein by reference in its entirety. The image capture device 702 may be configured to capture static content and/or may be configured to capture video content.

The stitching module 704 is configured to receive the panoramic content captured by the image capture device 702. In some implementations, the received panoramic content is composed of two or more images obtained from respective ones of the imaging sensors of the image capture device 702. These images may have overlapping fields of view with other one(s) of the captured images. Moreover, in some implementations, the stitching module 704 may be embodied within the image capture device 702. The output of stitching module 704 may include two image facets (such as, for example, the aforementioned RSP-3×2 frame packing arrangement or RSP-2×3 frame packing arrangement).

In the illustrated embodiment, each image facet may be fed into a respective encoder 706, 708. For example, where the output of the stitching module 704 is an RSP-3×2 frame of imaging data, the top image facet may be fed into encoder A 706, while the bottom image facet may be fed into encoder B 708. Herein lies one salient advantage of the encoding/decoding apparatus 700 illustrated in FIG. 7. Namely, as the top image facet and the bottom image facet may have identical resolution with each of these image facets having perfect continuity, the use of two separate encoders 706, 708 may allow for a more efficient encoding of imaging data by, inter alia, effectively doubling the throughput as well as improving upon the compression efficiencies of the encoders 706, 708. In some implementations, the output of the stitching module 704 may include two (or more) image facets with disparate numbers of pixels such as that described with reference to FIGS. 8A-8E described infra. Additionally, while FIG. 7 illustrates two encoders (i.e., encoder A 706 and encoder B 708), in some implementations the number of encoders may be increased (e.g., three encoders for the frame packing arrangement of FIG. 4B may be utilized, for example, e.g., one encoder for the left image facet 406, one encoder for the right image facet 410, and one encoder for the polar imaging data included in facets 408, 412 as but one example).

Transmission line 710 may provide for a transmission path for the encoded data coming from, for example, encoder A 706 and encoder B 708. Transmission line 710 may include a wired transmission line (e.g., an Ethernet cable) and/or may include a wireless transmission line (e.g., using a Wi-Fi transmission protocol and/or other wireless transmission protocols). In some implementations, the output of encoders 706, 708 may be combined prior to transmission on transmission line 710. For example, top image facet 512 may be combined with bottom image facet 522 into a single frame of imaging data 500 prior to transmission over transmission line 710. In other implementations, the output of encoders 706, 708 may be transmitted over transmission line 710 as separate bitstreams (e.g., stored as separate tracks inside a container file). These and other implementations would be readily apparent to one of ordinary skill given the contents of the present disclosure.

In the illustrated embodiment, each image facet may be received by a respective decoder 712, 714. For example, where the imaging information received over transmission line 710 is an RSP-3×2 frame of imaging data, the top image facet may be fed into decoder A 712, while the bottom image facet may be fed into decoder B 714. Herein lies yet another salient advantage of the encoding/decoding apparatus 700 illustrated in FIG. 7. Namely, the effective doubling of the throughput for, for example, decoders 712, 714. In some implementations, the transmission of imaging information over transmission line 710 may include two (or more) image facets with disparate numbers of pixels such as that described with reference to FIGS. 8A-8E described infra. Additionally, while FIG. 7 illustrates two decoders (i.e., decoder A 712 and decoder B 714), in some implementations the number of decoders may be increased (e.g., three decoders for the frame packing arrangement of FIG. 4B may be utilized, for example, by using one decoder for the left image facet 406, one decoder for the right image facet 410, and one decoder for the polar imaging data included in facets 408, 412, as but one example).

Reconstruction module 716 may receive the output of the decoders 712, 714. Additionally, in some implementations reconstruction module 716 may also receive an input that is indicative of a viewport of interest for the obtained panoramic content. In implementations in which reconstruction module 716 receives a viewport of interest, the imaging data associated with the received viewport position may be output to display device 718 into a desired projection suitable for display on display device 718. In some implementations, the entire panoramic content is reconstructed into a spherical format (or other desired projection format such as ERP, icosahedron, cube map and the like) and output to display device 718.

Non-Uniform Encoding Quality and/or Spatial Resolution Considerations

In some implementations, it may be desirable to alter the encoding quality for various ones (or portions) of the imaging facets, and/or downsample various ones (or portions) of the imaging facets. For example, when reproducing panoramic content on a display device, it may be desirable to maintain the imaging quality for areas of interest. These areas of interest may include a received viewport position, or may be representative of a probability for a future area of interest (e.g., when viewing static panoramic content, imaging along an equatorial plane and/or other areas of interest). Conversely, it may be desirable to decrease the imaging quality and/or downsample the imaging content in other areas of the captured panoramic content in certain areas. For example, if it is determined (or expected) that a certain area within the panoramic imaging content is of decreased importance, it may be desirable to decrease the imaging quality and/or downsample these regions prior to transmission over, for example, transmission line 710 in FIG. 7. While the embodiments of FIGS. 8A-8E will be primarily discussed in the context of exemplary RSP-3×2 frame packing arrangements, it would be readily appreciated by one of ordinary skill given the contents of the present disclosure that the techniques described below may be equally applied to other frame packing arrangements such as, for example, the frame packing arrangements depicted in FIGS. 1A-1C and 3A-4F.

Figure 8A:
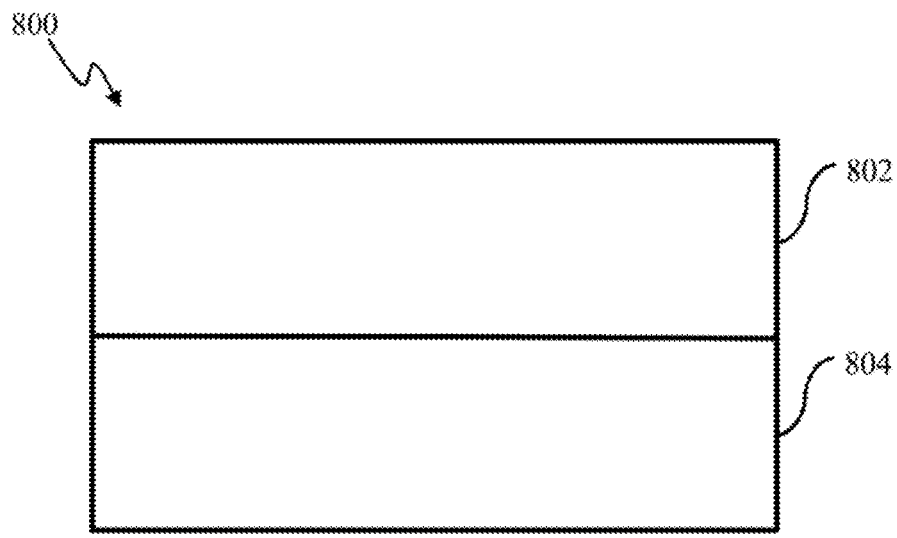
FIG. 8A is a graphical representation of an exemplary RSP 3×2 frame packing arrangement, useful in describing the principles of the present disclosure.

Referring to FIG. 8A, an exemplary RSP-3×2 frame packing arrangement 800 is illustrated having top imaging facet 802 and bottom imaging facet 804. For example, the top imaging facet 802 may be determined to be of higher importance and may be encoded at a higher imaging quality by, for example, lowering the quantization parameter (QP) for the pixels in the top imaging facet 802 during the encoding process. In some implementations, the bottom imaging facet 804 may be determined to be of lower importance and may be encoded at a lower imaging quality by, for example, increasing the QP for the pixels in the bottom imaging facet 804 during the encoding process, or vice versa. Additionally, in some implementations it may be desirable to alter the imaging quality by, for example, adjusting QP within a portion of an imaging facet. For example, where the top imaging facet 802 is indicative of the front, right and left portions of panoramic content, it may be desirable to increase the imaging quality (lower QP) for the portion of the imaging facet associated with the front of the image, while decreasing the imaging quality (higher QP) for the portions of the imaging facet associated with right and left portions of the panoramic content, for example. In some implementations, this may be accomplished using slices or tiles of the type known in the image processing arts.

Figure 8B:
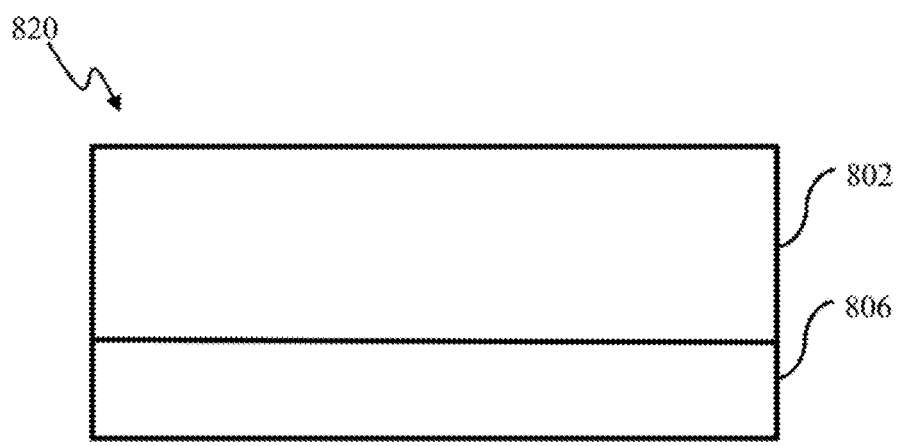
FIG. 8B is a graphical representation of the exemplary RSP frame packing arrangement of FIG. 8A in which the bottom facet has been downsampled vertically, useful in describing the principles of the present disclosure.

Referring to FIG. 8B, an exemplary RSP-3×2 frame packing arrangement 820 is illustrated having top imaging facet 802 and bottom imaging facet 806. In the illustrated embodiment, the bottom imaging facet 806 is downsampled vertically by a factor of two. In other words, by sub-sampling the bottom facet vertically (i.e., keeping the same width, but reducing the height by a factor of two for the bottom imaging facet 806), the 3:2 aspect ratio of the frame packing arrangement has been altered into a 2:1 aspect ratio for the frame packing arrangement 820. Accordingly, as the aspect ratio is now 2:1 (which is closer in value to an aspect ratio of 16:9), the frame packing arrangement 820 of FIG. 8B may be more suitable from commonly (widely) deployed extant imaging codecs.

Figure 8C:
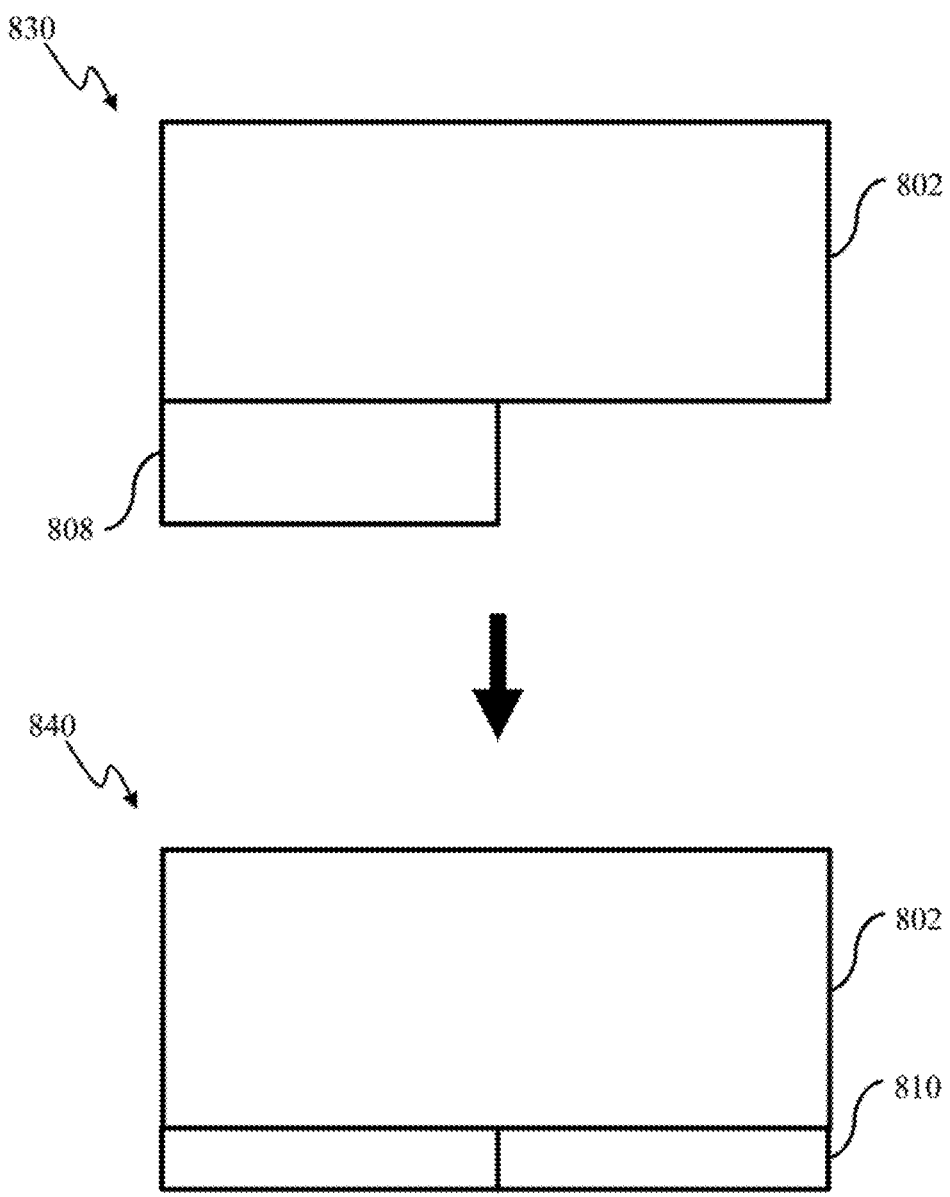
FIG. 8C is a graphical representation of the exemplary RSP frame packing arrangement of FIG. 8A in which the bottom facet has been downsampled vertically and horizontally and rearranged, useful in describing the principles of the present disclosure.

Referring to FIG. 8C, exemplary RSP-3×2 frame packing arrangements 830, 840 are illustrated. For example, in frame packing arrangement 830, the bottom imaging facet 808 has been downsampled vertically by a factor of two as well as downsampled horizontally by a factor of two. The bottom imaging facet 808 may be split and rearranged into bottom imaging facet 810. Accordingly, frame packing arrangement 840 will now have a 12:5 aspect ratio. As compared with the frame packing arrangement in FIG. 8B, the pixel count of FIG. 8C has been reduced by 16.6%. Moreover, the number of pixels has been reduced by 53% as compared with an ERP projection panoramic image while maintaining the same resolution as the ERP projection in, for example, 270° of coverage along the equator and 90° of coverage along the meridian (i.e., for the imaging information contained within the top imaging facet 802).

Figure 8E:
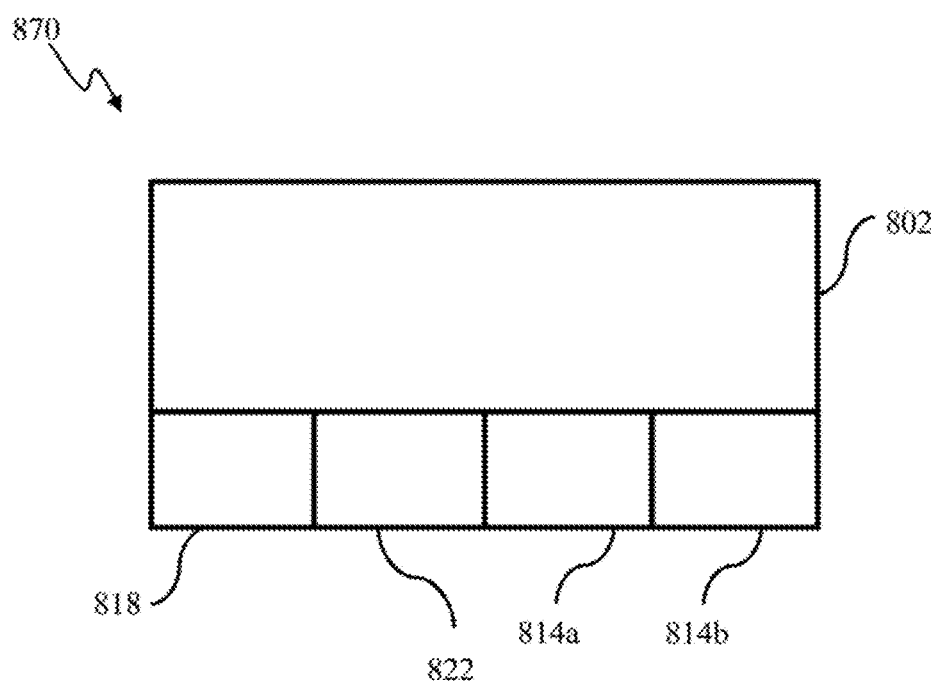
FIG. 8E is a graphical representation of the exemplary RSP frame packing arrangement of FIG. 8D in which the bottom facet has been rearranged, useful in describing the principles of the present disclosure.

In the exemplary context of RSP-3×2 frame packing arrangements, it may be desirable to maintain the imaging quality along a given equatorial plane (e.g., front, left, back and right side portion of a panoramic image), while de-emphasizing the portions of the images located at the poles (e.g., top and bottom portions of a panoramic image). In some instances, the vast majority of the interesting objects of interest may be captured along the given equatorial plane. FIGS. 8D and 8E illustrate one exemplary methodology for accomplishing this emphasis along a given equatorial plane. Specifically, FIG. 8D illustrates an RSP-3×2 frame packing arrangement 850 where the bottom facet 804 has been divided up between the two polar regions 812, 816 and the back equatorial region 814. In frame packing arrangement 860, the polar regions 812, 816 have been downsampled vertically by a factor of two as well as downsampled horizontally by a factor of two resulting in imaging facets 818, 822. Imaging facet 814 has been maintained in frame packing arrangement 860. In frame packing arrangement 870 as illustrated in FIG. 8E, the downsampled polar region facets 818, 822 have been placed adjacent to one another, while the equatorial imaging facet 814 has been split up and rearranged into imaging facets 814a, 814b. Frame packing arrangement 870 has a 2:1 aspect ratio, while preserving the imaging resolution along all of a given equatorial plane. However, as the level of discontinuity has been decreased as compared with the frame packing arrangements 820, 840 in FIGS. 8B and 8C, in some implementations the compression efficiency for frame packing arrangement 870 of FIG. 8E may be less than that of frame packing arrangements 820, 840.

Figure 9A:
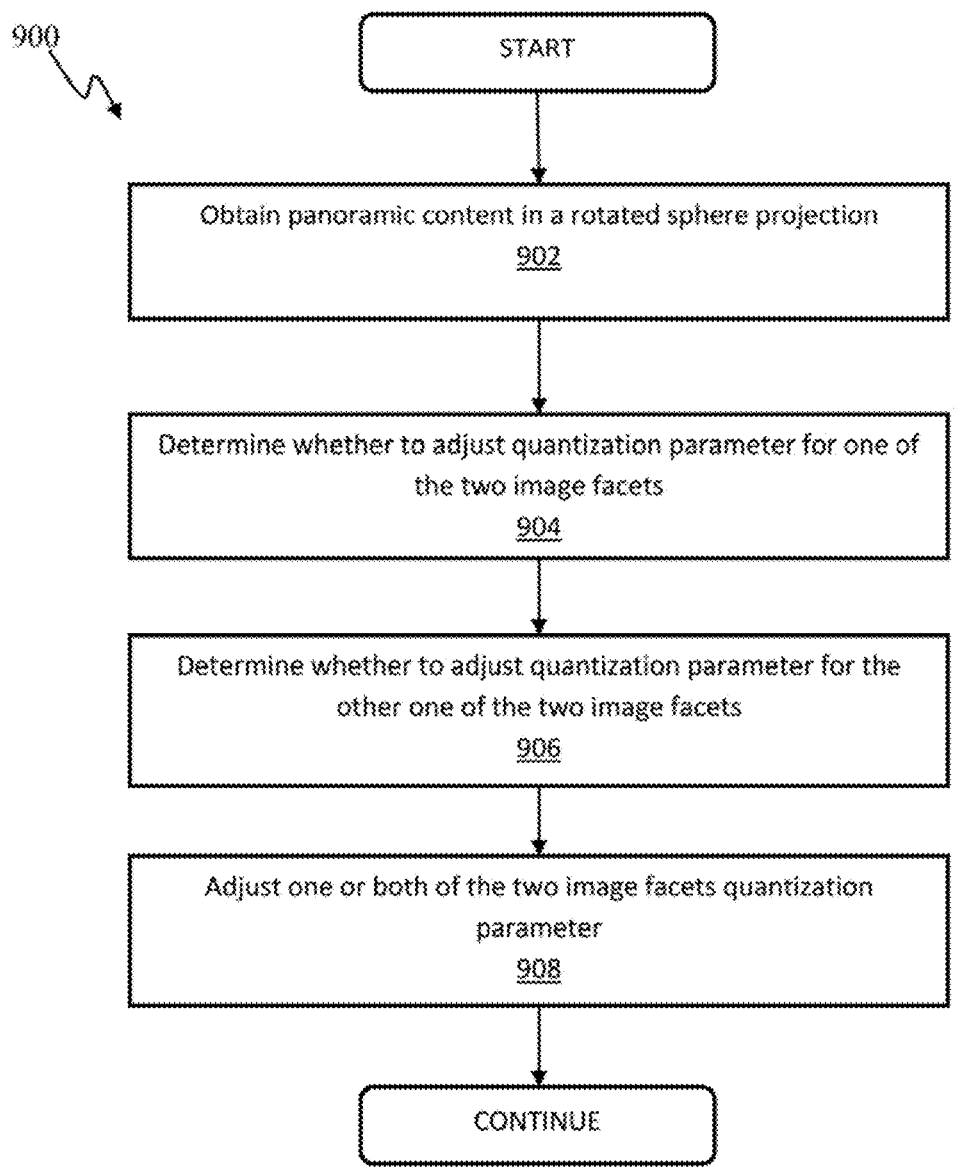
FIG. 9A is a logical flow diagram illustrating an exemplary embodiment for adjusting the quantization parameter of one or both of the two image facets of a rotated sphere projection, useful in describing the principles of the present disclosure.

Referring now to FIG. 9A, one exemplary methodology 900 for the adjustment of one or both of the two image facets quantization parameter is shown. At step 902, panoramic content is obtained in a rotated sphere projection and at step 904, a determination is made as to whether to adjust the quantization parameter for one (or portions thereof) for one of the two image facets. As a brief aside, a rotated sphere projection is generally composed of two facets with each facet having good continuity within the respective facet. In some implementations, it may be desirable to adjust the quantization parameter such that the value varies spatially throughout the facet. For example, the quantization may be varied higher or lower, depending upon a determined (or anticipated) area of interest for the panoramic content. Other considerations may include adjusting the quantization parameter as a function of the objects contained therein. For example, relatively simple objects (e.g., the sky, objects in shade and/or other homogenous objects where visual detail may be deemphasized) may have their QP increased, while more visually complex objects or other objects of interest may have their QP decreased (increase in quality). For example, the use of superpixels such as that described in co-owned and co-pending U.S. patent application Ser. No. 15/251,896 filed Aug. 30, 2016 and entitled "Apparatus and Methods for Video Image Post-Processing for Correcting Artifacts", the contents of which being incorporated herein by reference in its entirety, may be utilized in conjunction with the determination for whether or not to alter QP values within portions of an imaging facet.

At step 906, a determination is made as to whether to adjust the quantization parameter for the other one (or portions thereof) for one of the two image facets using, inter alia, one or more of the techniques described with reference to step 904. At step 908, one or both of the two image facets (or respective portions thereof) QP values may be adjusted. Accordingly, through the adjustment of the QP values within, for example, a rotated sphere projection, various compression efficiencies may be enhanced (increased) or de-emphasized (decreased) dependent upon various considerations as would be readily apparent to one of ordinary skill given the contents of the present disclosure.

Figure 9B:
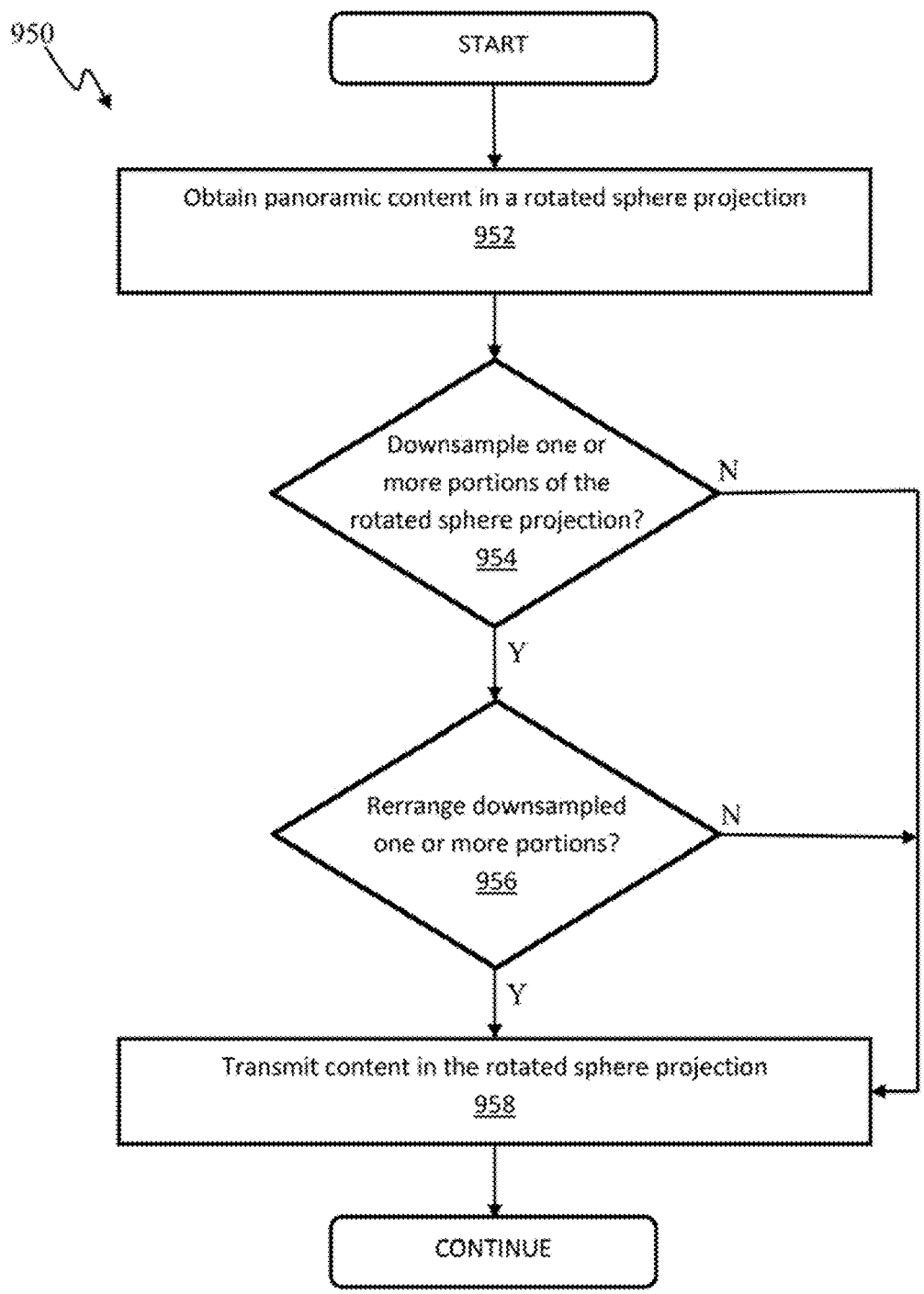
FIG. 9B is a logical flow diagram illustrating an exemplary embodiment for transmitting panoramic content in a rotated sphere projection that has been optimized for streaming applications, useful in describing the principles of the present disclosure.

Referring now to FIG. 9B, an exemplary methodology 950 for decreasing the pixel size of frames for a rotated sphere projection (such as, for example, RSP-3×2 frame packing arrangements, RSP-2×3 frame packing arrangements and other RSP frame packing arrangements) is shown. At step 952, panoramic content is obtained in a rotated sphere projection. At step 954, a determination is made whether to downsample one or more portions of the rotated sphere projection. For example, some or all of the considerations considered with reference to FIGS. 8B-8E may be taken into consideration when determining whether to downsample one or more portions of the rotated sphere projection. If it is determined, that downsampling shouldn't be performed, the obtained panoramic content in the rotated sphere projection is transmitted at step 958. If it is determined that downsampling should be performed, at step 956 it is determined whether the downsampled one or more portions should be rearranged. In some implementations, when downsampling is performed horizontally (in addition to, or alternatively from vertical downsampling), it may be desirable to rearrange the downsampled one or more portions in accordance with line buffer limitations, continuity considerations and/or frame packing height considerations and the like. Rearrangement may also be performed according to the content contained within a frame and may be varied as the content varies (i.e. on a per-frame basis).

Exemplary Apparatus—

Figure 10:
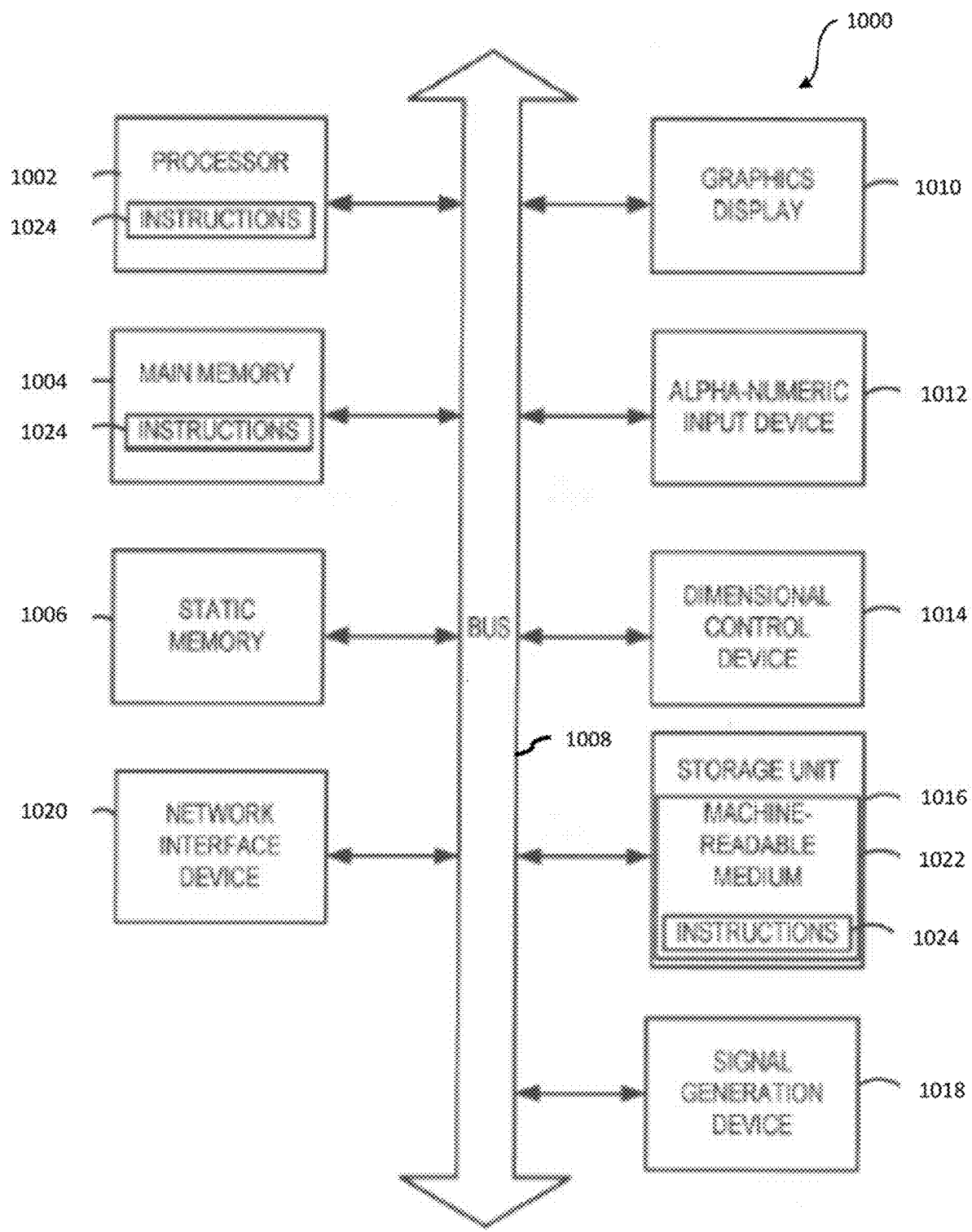
FIG. 10 is a block diagram of an exemplary implementation of a computing device, useful in encoding and/or decoding the exemplary frame packing arrangements as described herein.

FIG. 10 is a block diagram illustrating components of an example computing system able to read instructions from a computer-readable medium and execute them in one or more processors (or controllers). The computing system in FIG. 10 may represent an implementation of, for example, an image/video processing device for encoding and/or decoding of the various frame packing arrangements as discussed with respect to FIGS. 1A-4G, 5D-5J, and 8A-8E or performing.

The computing system 1000 can be used to execute instructions 1024 (e.g., program code or software) for causing the computing system 1000 to perform any one or more of the encoding/decoding methodologies (or processes) described herein. In alternative embodiments, the computing system 1000 operates as a standalone device or a connected (e.g., networked) device that connects to other computer systems. The computing system 1000 may include, for example, a personal computer (PC), a tablet PC, a notebook computer, or other device capable of executing instructions 1024 (sequential or otherwise) that specify actions to be taken. In another embodiment, the computing system 1000 may include a server. In a networked deployment, the computing system 1000 may operate in the capacity of a server or client in a server-client network environment, or as a peer device in a peer-to-peer (or distributed) network environment. Further, while only a single computer system 1000 is illustrated, a plurality of computing systems 1000 may operate to jointly execute instructions 1024 to perform any one or more of the encoding/decoding methodologies discussed herein.

The example computing system 1000 includes one or more processing units (generally processor apparatus 1002). The processor apparatus 1002 may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The computing system 1000 also includes a main memory 1004. The computing system 1000 may include a storage unit 1016. The processor 1002, memory 1004 and the storage unit 1016 may communicate via a bus 1008.

In addition, the computing system 1000 may include a static memory 1006, a display driver 1010 (e.g., to drive a plasma display panel (PDP), a liquid crystal display (LCD), a projector, or other types of displays). The computing system 1000 may also include input/output devices, e.g., an alphanumeric input device 1012 (e.g., touch screen-based keypad or an external input device such as a keyboard), a dimensional (e.g., 2-D or 3-D) control device 1014 (e.g., a touch screen or external input device such as a mouse, a trackball, a joystick, a motion sensor, or other pointing instrument), a signal capture/generation device 1018 (e.g., a speaker, camera, and/or microphone), and a network interface device 1020, which also are configured to communicate via the bus 1008.

Embodiments of the computing system 1000 corresponding to a client device may include a different configuration than an embodiment of the computing system 1000 corresponding to a server. For example, an embodiment corresponding to a server may include a larger storage unit 1016, more memory 1004, and a faster processor 1002 but may lack the display driver 1010, input device 1012, and dimensional control device 1014. An embodiment corresponding to an action camera may include a smaller storage unit 1016, less memory 1004, and a power efficient (and slower) processor 1002 and may include multiple camera capture devices 1018.

The storage unit 1016 includes a computer-readable medium 1022 on which is stored instructions 1024 (e.g., software) embodying any one or more of the methodologies or functions described herein. The instructions 1024 may also reside, completely or at least partially, within the main memory 1004 or within the processor 1002 (e.g., within a processor's cache memory) during execution thereof by the computing system 1000, the main memory 1004 and the processor 1002 also constituting computer-readable media. The instructions 1024 may be transmitted or received over a network via the network interface device 1020.

While computer-readable medium 1022 is shown in an example embodiment to be a single medium, the term "computer-readable medium" should be taken to include a single medium or multiple media (e.g., a centralized or distributed database, or associated caches and servers) able to store the instructions 1024. The term "computer-readable medium" shall also be taken to include any medium that is capable of storing instructions 1024 for execution by the computing system 1000 and that cause the computing system 1000 to perform, for example, one or more of the methodologies disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "computing device", includes, but is not limited to, personal computers (PCs) and mini-computers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smart phones, personal integrated communication or entertainment devices, or literally any other device capable of executing a set of instructions.

As used herein, the term "computer program" or "software" is meant to include any sequence or human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans), Binary Runtime Environment (e.g., BREW), and the like.

As used herein, the terms "integrated circuit", is meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the term "processing unit" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "camera" may be used to refer without limitation to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed:

1. A method for decoding and displaying panoramic content, the method comprising:
    obtaining a panoramic projection associated with panoramic content, the panoramic projection having a first portion and a second portion, the first portion comprising a first continuous image segment, the second portion comprising a second continuous image segment, and the panoramic projection comprising a discontinuity between the first and second continuous image segments;
    receiving a viewport position with respect to the panoramic content, the viewport position correlating to an area within the panoramic content viewed by a user;
    decoding at least a portion of the panoramic projection comprising the discontinuity, the at least a portion correlating to the viewport position and comprising one or more of (i) at least a portion of the first portion, or (ii) at least a portion of the second portion, and discarding remaining portions of the panoramic portion other than the at least a portion of the panoramic projection prior to decoding; and
    transmitting the decoded at least a portion of the panoramic projection to a rendering device.

2. The method of claim 1, wherein the obtaining of the panoramic projection comprises receiving (i) a first cropped portion of a projection of source content and (ii) a second cropped portion of a projection of the source content, the source content comprising three-dimensional content.

3. The method of claim 1, wherein the panoramic projection includes a nulled portion containing decoding information.

4. The method of claim 1, wherein the decoding of the at least portion comprises decoding both of the at least portion of the first portion and the at least portion of the second portion via a plurality of decoders, a first decoder of the plurality of decoders being configured to decode at least the first portion of the panoramic projection, a second decoder of the plurality of decoders being configured to decode at least the second portion of the panoramic projection.

5. The method of claim 4, further comprising reconstructing the decoded at least portion of the first portion and the decoded at least portion of the second portion to generate imaging data associated with the viewport position;
    wherein the transmitting of the decoded at least portion comprises transmitting the imaging data associated with the viewport position.

6. The method of claim 5, wherein the reconstructing comprises reconstructing (i) a first output from a first decoder configured to decode at least the portion of the first portion and (ii) a second output from a second decoder configured to decode at least the portion of the second portion.

7. The method of claim 1, further comprising enabling a downsample of one or more portions of the panoramic projection, and rearrangement of the downsampled one or more portions, the obtained panoramic projection comprising the rearranged downsampled one or more portions.

8. A decoder apparatus comprising:
    one or more input interfaces configured to receive imaging data;
    a processor apparatus; and
    a non-transitory computer-readable apparatus in data communication with the processor apparatus and comprising a storage medium, the storage medium comprising at least one computer program, the at least one computer program comprising a plurality of instructions configured to, when executed by the processor apparatus, enable the decoder apparatus to:
        receive the imaging data, the imaging data comprising a first portion of a panoramic projection and a second portion of the panoramic projection, the first and second projections arranged so as to be separated along a single seam of discontinuity;
        determine a viewport area within the imaging data;
        identify portions of the panoramic projection corresponding an area outside the determined viewport area;
        decode one or more of respective portions of the first portion and the second portion absent the identified portions, the respective portions corresponding to the determined viewport area;
        transmit the decoded one or more respective portions to a rendering device; and
        cause display of a representation of the viewport area on the rendering device, the representation comprising the decoded one or more respective portions.

9. The decoder apparatus of claim 8, wherein the receipt of the imaging data comprises receipt of the imaging data from an encoder apparatus at a first decoder process and a second decoder process of the decoder apparatus via respective first and second ones of the one or more input interfaces.

10. The decoder apparatus of claim 9, wherein the first and second decoder processes are configured to output the decoded one or more respective portions to a reconstruction module, the reconstruction module being configured to output the representation to the rendering device based at least on receipt of the determined viewport area.

11. The decoder apparatus of claim 8, wherein the first portion comprises a first cropped portion of a projection derived from a spherical image, and the second portion comprises a second cropped portion of a projection derived from the spherical image, the first and second cropped portions being algorithmically stitched along one boundary in a frame packing arrangement, the one boundary comprising the single seam of discontinuity.

12. The decoder apparatus of claim 8, wherein the panoramic projection includes a blacked out portion containing decoding information.

13. A computerized apparatus comprising:
an image capturing device configured to capture source content;
one or more encoder apparatus configured to:
obtain a projection of the source content; and
combine a first portion of the projection with a second portion of the projection to obtain a panoramic projection wherein redundant image information as between the first portion of the projection and the second portion of the projection is nulled, wherein the first portion comprises a first image, the second portion comprises a second image, and the generated panoramic projection comprises a discontinuity between the first and second images; and
one or more decoder apparatus configured to:
receive the generated panoramic projection from the one or more encoder apparatus;
receive a viewport position associated with the panoramic projection; and
decode one or more portions of the panoramic projection based at least on the received viewport position, the one or more portions being associated with one or more of (i) the first portion of the panoramic projection, or (ii) the second portion of the panoramic projection;
wherein the decode of the one or more portions of the panoramic projection is configured to:
responsive to the received viewport position being oriented entirely within the first portion of the panoramic projection or the second portion of the panoramic projection, decode a respective one of the first or second portions; or
responsive to the received viewport position being oriented over the discontinuity, decode at least a portion of the first portion of the panoramic projection and at least a portion of the second portion of the panoramic projection.

14. The computerized apparatus of claim 13, wherein at least one of the one or more encoder apparatus is further configured to:
determine a need to downsample one or more portions of the panoramic projection;
based on the determination to downsample the one or more portions:
downsample the one or more portions of the panoramic projection;
based on a determination to rearrange the downsampled one or more portions, rearrange the downsampled one or more portions, and transmit the rearranged downsampled one or more portions to the one or more decoders; and
based on a determination not to rearrange the downsampled one or more portions, transmit the downsampled one or more portions to the one or more decoders.

15. The computerized apparatus of claim 13, wherein at least one of the one or more encoders is further configured to:
downsample the first portion of the projection;
divide the downsampled first portion into a plurality of portions of the first portion; and
rearrange the plurality of portions of the first portion into a new panoramic projection, the new panoramic projection having a different aspect ratio than the generated panoramic projection.

16. The computerized apparatus of claim 13, wherein at least one of the one or more encoders is further configured to:
downsample a plurality of portions of the panoramic projection;
determine whether to adjust respective at least first and second quantization parameters for at least a first one and a second one of the plurality of portions of the panoramic projection; and
based on the determination, adjust one or more of the first or second quantization parameters.

17. The computerized apparatus of claim 13, wherein the one or more decoders comprise a first decoder and a second decoder, the first decoder being configured to decode at least the first portion of the projection, the second decoder being configured to decode at least the second portion of the projection, the first and second decoders being further configured to output decoded imaging data to a reconstruction module, and cause the reconstruction module to output a decoded projection to a rendering device.

18. The computerized apparatus of claim 13, wherein the decode of the one or more portions of the panoramic projection comprises, responsive to the received viewport position being oriented over the discontinuity, a decode of the at least portion of the first portion of the panoramic projection and the at least portion of the second portion of the panoramic projection that collectively correspond to the viewport position.

19. The computerized apparatus of claim 13, wherein the one or more decoders are further configured to:
decode an entirety of the panoramic projection, the entirety comprising an entirety of the first portion and an entirety of the second portion; and
cause display of the decoded entirety of the panoramic projection.

20. The computerized apparatus of claim 13, wherein the source content comprises spherical content, and the projection of the source content comprises an equirectangular projection of the spherical content, the spherical content comprising a first spherical portion and a second spherical portion each having a coverage of 270° by 90°.

* * * * *